United States Patent
Tochigi et al.

(10) Patent No.: US 9,963,128 B2
(45) Date of Patent: May 8, 2018

(54) TRAVEL ASSISTANCE DEVICE

(71) Applicant: TOYOTA JIDOSHA KABUSHIKI KAISHA, Toyota-shi, Aichi-ken (JP)

(72) Inventors: Kohei Tochigi, Susono (JP); Kazuyuki Fujita, Gotenba (JP); Shinichi Nagata, Yokohama (JP); Minami Sato, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/648,917

(22) Filed: Jul. 13, 2017

(65) Prior Publication Data

US 2018/0022328 A1 Jan. 25, 2018

(30) Foreign Application Priority Data

Jul. 19, 2016 (JP) .................................. 2016-141343

(51) Int. Cl.
*B60T 7/22* (2006.01)
*G08G 1/16* (2006.01)

(52) U.S. Cl.
CPC ................ *B60T 7/22* (2013.01); *G08G 1/166* (2013.01); *B60T 2201/022* (2013.01); *B60T 2210/32* (2013.01); *B60T 2250/03* (2013.01); *B60T 2250/04* (2013.01)

(58) Field of Classification Search
CPC .. B60T 7/22; B60T 2201/022; B60T 2210/32; B60T 2250/03; B60T 2250/04
See application file for complete search history.

(56) References Cited

U.S. PATENT DOCUMENTS

| 2004/0155811 A1* | 8/2004 | Albero | B60K 31/0008 342/70 |
|---|---|---|---|
| 2017/0274898 A1* | 9/2017 | Nakamura | B60W 30/12 |
| 2017/0297568 A1* | 10/2017 | Kentley | B60W 30/09 |
| 2017/0309178 A1* | 10/2017 | Hernandez | G08G 1/163 |

FOREIGN PATENT DOCUMENTS

JP 4637890 B2 12/2010

* cited by examiner

*Primary Examiner* — Richard M Camby
(74) *Attorney, Agent, or Firm* — Sughrue Mion, PLLC

(57) ABSTRACT

A travel assistance device includes an actuator and an electronic control unit. The electronic control unit is configured to predict a future position of a vehicle and an object, set an assistance range around the vehicle, determine whether an avoidance start condition is satisfied and in which of a first roadway area, a second roadway area, and a sidewalk area the object is positioned, set the avoidance start condition and a movement range of the object, so that the avoidance start condition is more easily determined to be satisfied when the object is in the first roadway area than when the object is in the second roadway area, and more easily determined to be satisfied when the object is in the second roadway area than when the object is in the sidewalk area, and perform a collision avoidance operation when the avoidance start condition is satisfied.

13 Claims, 13 Drawing Sheets

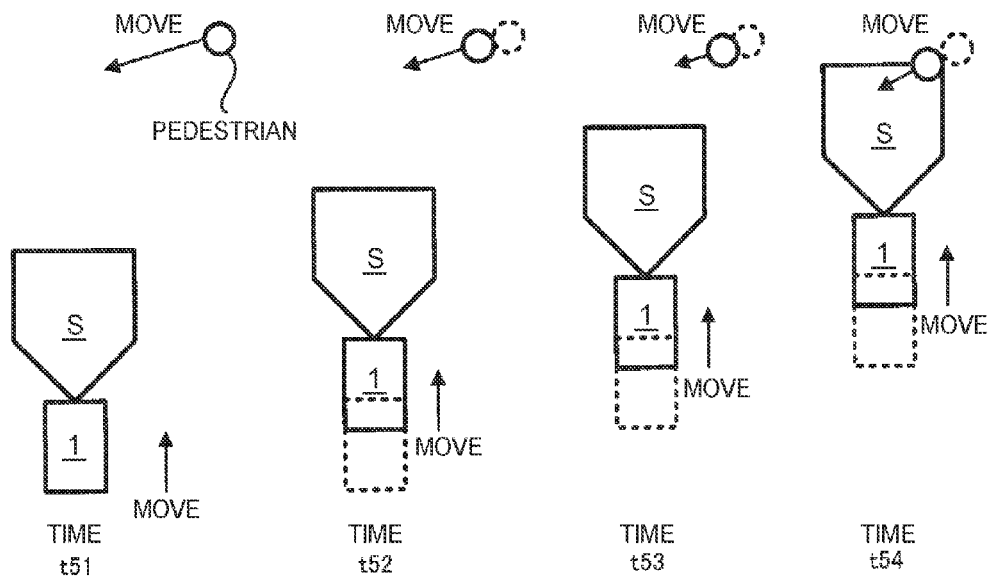
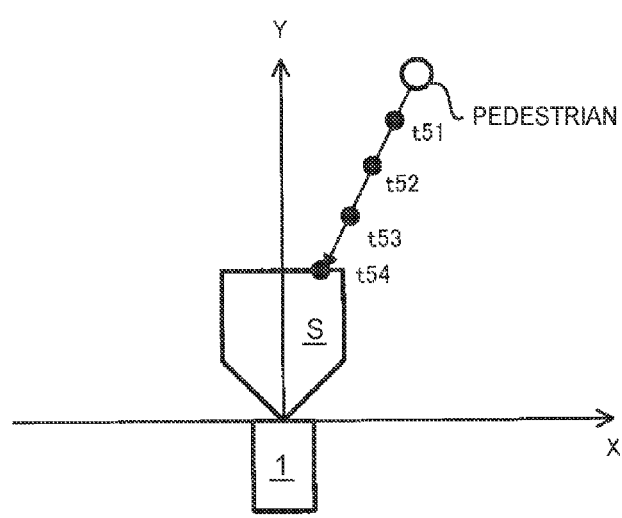

ROADWAY

SIDEWALK

ROADWAY

SIDEWALK

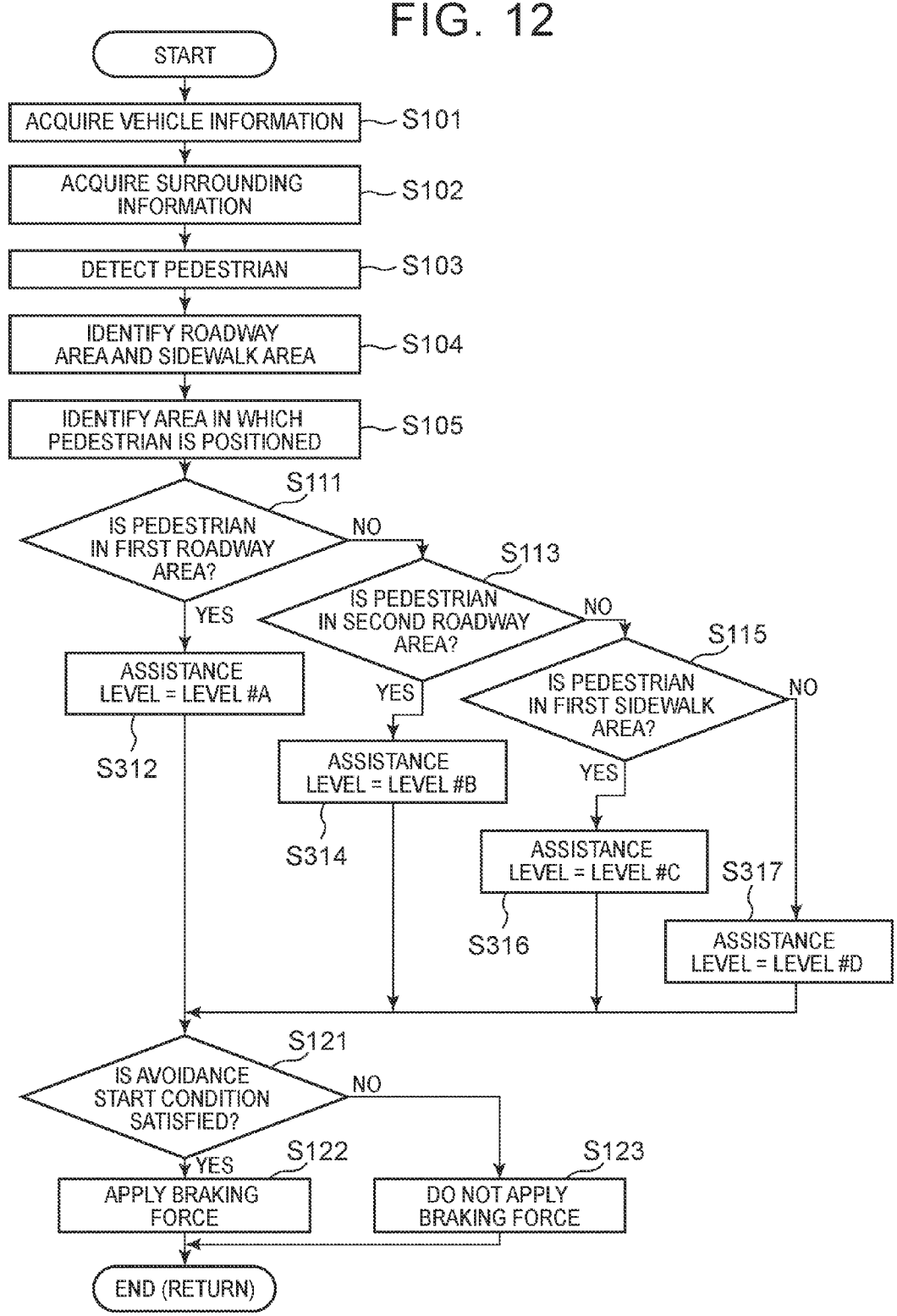

TRAVEL ASSISTANCE DEVICE

INCORPORATION BY REFERENCE

The disclosure of Japanese Patent Application No. 2016-141343 filed on Jul. 19, 2016 including the specification, drawings and abstract is incorporated herein by reference in its entirety.

BACKGROUND

1. Technical Field

The present disclosure relates to a travel assistance device.

2. Description of Related Art

A travel assistance device is known that assists in collision avoidance between a vehicle and an object by applying braking force to the vehicle when there is a possibility that the vehicle and the object will collide (for example, see Japanese Patent No. 4637890).

SUMMARY

An object that may collide with a vehicle is sometimes positioned not only on a roadway but also on a sidewalk. More specifically, when the object is a person, there is a possibility that a person on a sidewalk will jump out onto a roadway. In this case, the person who was positioned on the sidewalk may collide with a vehicle. In another case, when the object is a two-wheeled vehicle (for example, a motorcycle), a motorcycle parked in a parking lot may cross a sidewalk and enter a roadway. In this case, the two-wheeled vehicle that was positioned on the sidewalk may collide with a vehicle. Note that, even when the object is neither a person nor a two-wheeled vehicle, there is a full possibility that the object is positioned on a sidewalk.

Considering that a vehicle normally travels on a roadway (that is, a vehicle does not normally travel on a sidewalk), it is estimated that the possibility that an object positioned on a roadway will collide with a vehicle is higher than the possibility that an object positioned on a sidewalk will collide with a vehicle. However, the travel assistance device, described in Japanese Patent No. 4637890, does not consider at all whether an object is positioned on a roadway or on a sidewalk. This means that there is room for improvement in the travel assistance device described in Japanese Patent No. 4637890 in that the device cannot assist in collision avoidance between a vehicle and an object in consideration of whether the object is positioned on a roadway or on a sidewalk.

The present disclosure provides a travel assistance device capable of assisting in collision avoidance between a vehicle and an object in consideration of whether the object is positioned on a roadway or on a sidewalk.

A first aspect of the disclosure provides a travel assistance device. The travel assistance device according to the first aspect includes an actuator and at least one electronic control unit. The at least one electronic control unit is configured to predict a future position of a vehicle and a future position of an object, set an assistance range around the vehicle based on the future position of the vehicle, determine whether an avoidance start condition that the object is positioned in the assistance range within a predetermined time is satisfied, and determine in which of a first roadway area, a second roadway area, and a sidewalk area the object is positioned when the object is detected. The first roadway area is included in a roadway and corresponding to a traveling lane in which the vehicle travels. The second roadway area is included in the roadway and corresponding to a traveling lane in which the vehicle does not travel. The sidewalk area corresponds to a sidewalk. The at least one electronic control unit is configured to set at least one of the avoidance start condition and a movement range of the object, in such a way that the avoidance start condition is more easily determined to be satisfied when the object is determined to be positioned in the first roadway area than when the object is determined to be positioned in the second roadway area, and in such a way that the avoidance start condition is more easily determined to be satisfied when the object is determined to be positioned in the second roadway area than when the object is determined to be positioned in the sidewalk area. The movement range of the object is assumed by the at least one electronic control unit when the future position of the object is predicted. The at least one electronic control unit is configured to perform a collision avoidance operation to avoid collision between the vehicle and the object, by using the actuator, when the avoidance start condition is determined to be satisfied.

According to this aspect, at least one of the avoidance start condition and the movement range is set considering whether the object is positioned on the roadway or on the sidewalk. Therefore, as will be described in detail later, the first travel assistance device can assist in collision avoidance between the vehicle and the object considering whether the object is positioned on the roadway or on the sidewalk.

In the first aspect of the disclosure, the at least one electronic control unit may be configured to set the avoidance start condition by setting the assistance range, and set a first range as the assistance range when the object is determined to be positioned in the first roadway area, set a second range as the assistance range when the object is determined to be positioned in the second roadway area. The second range may be included in, and smaller than, the first range. The at least one electronic control unit may be configured to set a third range as the assistance range when the object is determined to be positioned in the sidewalk area. The third range may be included in, and smaller than, the second range.

According to this aspect, the assistance range (that is, the avoidance start condition) is set appropriately considering whether the object is positioned on the roadway or on the sidewalk.

In the first aspect of the disclosure, the collision avoidance operation may include a braking operation applying braking force to the vehicle. The at least one electronic control unit may be configured to perform the collision avoidance operation, by using the actuator, in such a way that, when the object is determined to be positioned in the first roadway area or the second roadway area and the avoidance start condition is determined to be satisfied, the braking force of a first magnitude is applied, by using the actuator, when the object is predicted to be positioned in a first part within the predetermined time and the object is predicted not to be positioned in a second part within the predetermined time. The first part may be included in the first range or the second range and not overlapping with the third range. The second part may be included in the first range or the second range and overlapping with the third range. The at least one electronic control unit may be configured to perform the collision avoidance operation, by using the actuator, in such a way that when the object is determined to be positioned in the first roadway area or the second roadway area and the avoidance start condition is determined to be satisfied. The braking force of a second magnitude larger than the first magnitude may be applied when the object is predicted to be positioned in the second part within the predetermined time.

According to this aspect, annoyance the passenger feels for the application of braking force is reduced, as will be described in detail later, since excessive braking force is not applied when the possibility of collision between the vehicle and a pedestrian is relatively low (that is, when the object is predicted not to be positioned in the second part).

In the first aspect of the disclosure, the at least one electronic control unit may be configured to set the movement range in such a way that the movement range when the object is determined to be positioned in the first roadway area is larger than the movement range when the object is determined to be positioned in the second roadway area and that the movement range when the object is determined to be positioned in the second roadway area is larger than the movement range when the object is determined to be positioned in the sidewalk area.

According to this aspect, the movement range is appropriately set considering whether the object is positioned on the roadway or on the sidewalk.

In the first aspect of the disclosure, the at least one electronic control unit may be configured to set the movement range by setting a moving speed of the object. The moving speed of the object may be assumed when the future position of the object is predicted. The at least one electronic control unit may be configured to set a first speed as the moving speed when the object is determined to be positioned in the first roadway area, set a second speed, slower than the first speed, as the moving speed when the object is determined to be positioned in the second roadway area, and set a third speed, slower than the second speed, as the moving speed when the object is determined to be positioned in the sidewalk area.

According to this aspect, the moving speed (that is, the movement range) is appropriately set considering whether the object is positioned on the roadway or on the sidewalk.

In the first aspect of the disclosure, the sidewalk area may include: a first sidewalk area corresponding to a sidewalk in which there is not a physical boundary between the sidewalk and the roadway; and a second sidewalk area corresponding to a sidewalk in which there is the physical boundary between the sidewalk and the roadway. The physical boundary may be capable of inhibiting an entry of the vehicle from the roadway into the sidewalk. The at least one electronic control unit may be configured to set at least one of the avoidance start condition and the movement range in such a way that the avoidance start condition is more easily determined to be satisfied when the object is determined to be positioned in the first sidewalk area than when the object is determined to be positioned in the second sidewalk area.

According to this aspect, the first travel assistance device can assist in collision avoidance between the vehicle and the object considering on which type of the sidewalk the object is positioned.

In the first aspect of the disclosure, the collision avoidance operation may include a braking operation applying braking force to the vehicle. The at least one electronic control unit may be configured to perform the collision avoidance operation in such a way that the vehicle to which the braking force is applied when the object is determined to be positioned in the first roadway area terminates deceleration earlier than the vehicle to which the braking force is applied when the object is determined to be positioned in the second roadway area and that the vehicle to which the braking force is applied when the object is determined to be positioned in the second roadway area terminates deceleration earlier than the vehicle to which the braking force is applied when the object is determined to be positioned in the sidewalk area.

According to this aspect, the mode of deceleration of the vehicle is adjusted considering whether the object is positioned on the roadway or on the sidewalk. Therefore, as will be described later, the first travel assistance device can assist in collision avoidance between the vehicle and the object considering whether the object is positioned on the roadway or on the sidewalk.

In the first aspect of the disclosure, the at least one electronic control unit may be configured to reduce a time until when the vehicle terminates deceleration, by adjusting a magnitude of the braking force.

In the first aspect of the disclosure, the at least one electronic control unit may be configured to reduce a time until when the vehicle terminates deceleration, by adjusting a time at which the braking force is applied to the vehicle.

In the first aspect of the disclosure, a length of the first range may be larger than a length of the second range in a vehicle width direction, and the length of the second range may be larger than a length of the third range in the vehicle width direction.

A second aspect of the disclosure provides a travel assistance device. The travel assistance device according to the second aspect includes an actuator and at least one electronic control unit. The at least one electronic control unit is configured to perform a collision avoidance operation to avoid collision between a vehicle and an object by applying braking force to the vehicle, when a predetermined collision avoidance condition is determined to be satisfied. The predetermined collision avoidance condition is defined based on a possibility of collision between the vehicle and the object. The at least one electronic control unit is configured to determine in which of a first roadway area, a second roadway area, and a sidewalk area the object is positioned when the object is detected. The first roadway area is included in a roadway and corresponding to a traveling lane in which the vehicle travels. The second roadway area is included in the roadway and corresponding to a traveling lane in which the vehicle does not travel. The sidewalk area corresponds to a sidewalk. The at least one electronic control unit is configured to perform the collision avoidance operation, by using the actuator, in such a way that the vehicle to which the braking force is applied when the object is determined to be positioned in the first roadway area terminates deceleration earlier than the vehicle to which the braking force is applied when the object is determined to be positioned in the second roadway area, and in such a way that the vehicle to which the braking force is applied when the object is determined to be positioned in the second roadway area terminates deceleration earlier than the vehicle to which the braking force is applied when the object is determined to be positioned in the sidewalk area.

According to this aspect, the mode of deceleration of the vehicle is adjusted considering whether the object is positioned on the roadway or on the sidewalk. Therefore, as will be described later, the second travel assistance device can assist in collision avoidance between the vehicle and the object considering whether the object is positioned on the roadway or on the sidewalk.

In the second aspect of the disclosure, the at least one electronic control unit may be configured to reduce a time until when the vehicle terminates deceleration, by adjusting a magnitude of the braking force.

According to this aspect, the mode of deceleration of the vehicle is adjusted by adjusting the magnitude of braking force.

In the second aspect of the disclosure, the at least one electronic control unit may be configured to reduce a time until when the vehicle terminates deceleration, by adjusting a time at which the braking force is applied to the vehicle.

According to this aspect, the mode of deceleration of the vehicle is adjusted by adjusting the time at which the application of braking force is started.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5A is a plan view showing a positional relationship between a vehicle and a pedestrian;

FIG. 5B is a plan view showing a positional relationship between a vehicle and a pedestrian;

FIG. 5C is a plan view showing a positional relationship between a vehicle and a pedestrian;

FIG. 5D is a plan view showing a positional relationship between a vehicle and a pedestrian;

FIG. 5E is a plan view showing a positional relationship between a vehicle and a pedestrian;

FIG. 12 is a flowchart showing a flow of the travel assistance operation in the third embodiment;

DETAILED DESCRIPTION OF EMBODIMENTS

Embodiments of a travel assistance device will be described below with reference to the drawings. In the description below, a vehicle on which an embodiment of the travel assistance device is mounted is used.

(1) Vehicle 1 in a First Embodiment

A vehicle 1 in the first embodiment will be described below. The vehicle 1 in the first embodiment is a vehicle to which an embodiment of the "first travel assistance device that sets an assistance range" is applied.

(1-1) Configuration of Vehicle 1 in the First Embodiment

Figure 1:
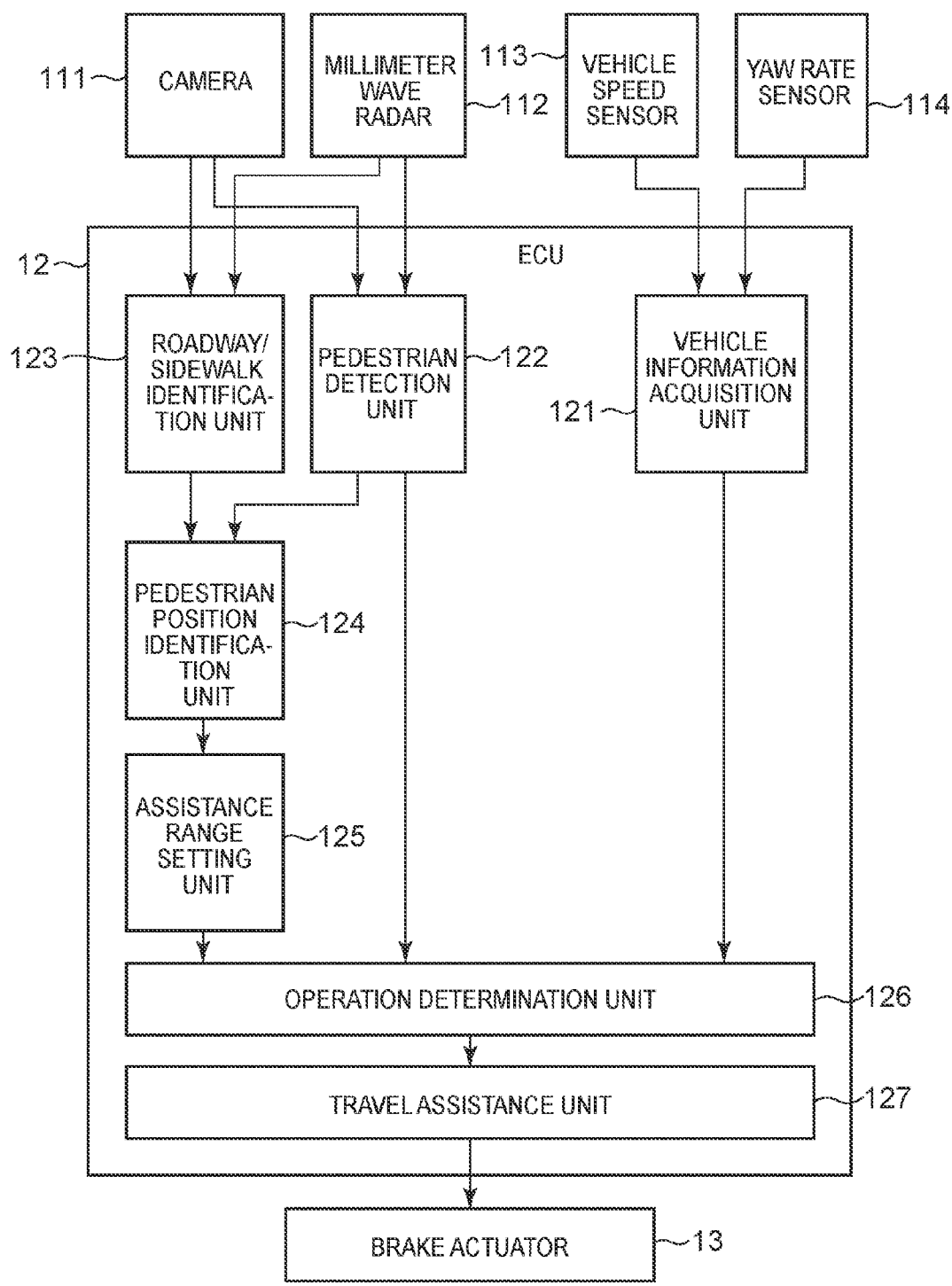
FIG. 1 is a block diagram showing a configuration of a vehicle in a first embodiment.

The configuration of the vehicle 1 in the first embodiment will be described with reference to FIG. 1. As shown in FIG. 1, the vehicle 1 includes a camera 111 that is one specific example of a "detection unit", a millimeter wave radar 112 that is one specific example of a "detection unit", a vehicle speed sensor 113, a yaw rate sensor 114, an Electronic Control Unit (ECU) 12 that is one specific example of the "travel assistance device" described above, and a brake actuator 13.

The camera 111 is a capturing device that captures the area ahead of the vehicle 1. The millimeter wave radar 112 uses millimeter waves to detect objects around the vehicle 1. The vehicle speed sensor 113 detects the vehicle speed of the vehicle 1. The yaw rate sensor 114 detects the yaw rate of the vehicle 1.

The ECU 12 controls the overall operation of the vehicle 1. In this embodiment, the ECU 12 mainly performs the travel assistance operation for assisting in collision avoidance between the vehicle 1 and an object around the vehicle 1. In this specification, an "object" refers to an arbitrary object the presence of which can be recognized by at least one of the camera 111 and the millimeter wave radar 112. In the first embodiment, since an object is a target for which the travel assistance operation is performed to avoid collision with the vehicle 1, it can be said that the object is essentially an arbitrary object that should avoid collision, or that should preferably avoid collision, with the vehicle 1. Typically, an object that may collide with the vehicle 1 is any object that is on, or near to, the traveling route of the vehicle 1 in the area ahead of the vehicle 1 along the traveling direction. An example of such an object is, for example, an obstacle, another vehicle, a pedestrian, a bicycle (or other light vehicle), an animal, and so on. The object may be a moving object or an object that is currently stationary but may move.

In the first embodiment, a pedestrian is used as an example of the object for convenience of description.

To perform the travel assistance operation, the ECU 12 includes therein the following units as logically implemented processing blocks or as physically implemented processing circuits: a vehicle information acquisition unit 121, a pedestrian detection unit 122, a roadway/sidewalk identification unit 123, a pedestrian position identification unit 124 that is one specific example of the "determination unit" described above, an assistance range setting unit 125 that is one specific example of the "setting unit" described above, an operation determination unit 126 that is one specific example of the "prediction unit" described above, and a travel assistance unit 127 that is one specific example of the "assistance unit" described above.

The operation of each of the vehicle information acquisition unit 121 to the travel assistance unit 127 will be described later in detail with reference to FIG. 2 and other figures. The outline of those units will be briefly described below. The vehicle information acquisition unit 121 acquires the vehicle speed and the yaw rate from the vehicle speed sensor 113 and the yaw rate sensor 114, respectively, as the vehicle information. The pedestrian detection unit 122 acquires the image information, which is the acquisition result of the camera 111, and the radar information, which is the detection result of the millimeter wave radar 112, as the surrounding information. The pedestrian detection unit 122 detects a pedestrian positioned around the vehicle 1, based on the image information and the radar information. The roadway/sidewalk identification unit 123 acquires the image information and the radar information and, based on the acquired image information and radar information, divides the surrounding area around the vehicle 1 into a plurality of types of segmented areas 141 (see FIG. 3). The pedestrian position identification unit 124 identifies in which of the plurality of types of segmented areas 141, identified by the roadway/sidewalk identification unit 123, the pedestrian detected by the pedestrian detection unit 122 is positioned. The assistance range setting unit 125 sets an assistance range S (see FIG. 4A) around the vehicle 1, with the vehicle 1 as the base, based on the identification result of the pedestrian position identification unit 124. The operation determination unit 126 predicts the future position of the vehicle 1 based on the vehicle information, predicts the future position of a pedestrian, detected by the pedestrian detection unit 122, based on the image information and the radar information, and predicts whether the pedestrian will be positioned in the assistance range S, set by the assistance range setting unit 125, within a predetermined time. If it is predicted that the pedestrian will be positioned in the assistance range S within the predetermined time, the travel assistance unit 127 controls the brake actuator 13 so that the collision avoidance operation is performed that applies braking force, capable of assisting in collision avoidance between the vehicle 1 and a pedestrian, to the vehicle 1.

The brake actuator 13 adjusts the hydraulic pressure of the brake fluid supplied to the wheel cylinder mounted on each wheel (not shown) so that braking force is applied to the vehicle 1 under the control of the travel assistance unit 127.

(1-2) Flow of the Travel Assistance Operation in the First Embodiment

Next, the flow of the travel assistance operation of the first embodiment will be described with reference to FIG. 2. The travel assistance operation shown in FIG. 2 is repeatedly performed at predetermined intervals by the ECU 12.

Figure 2:
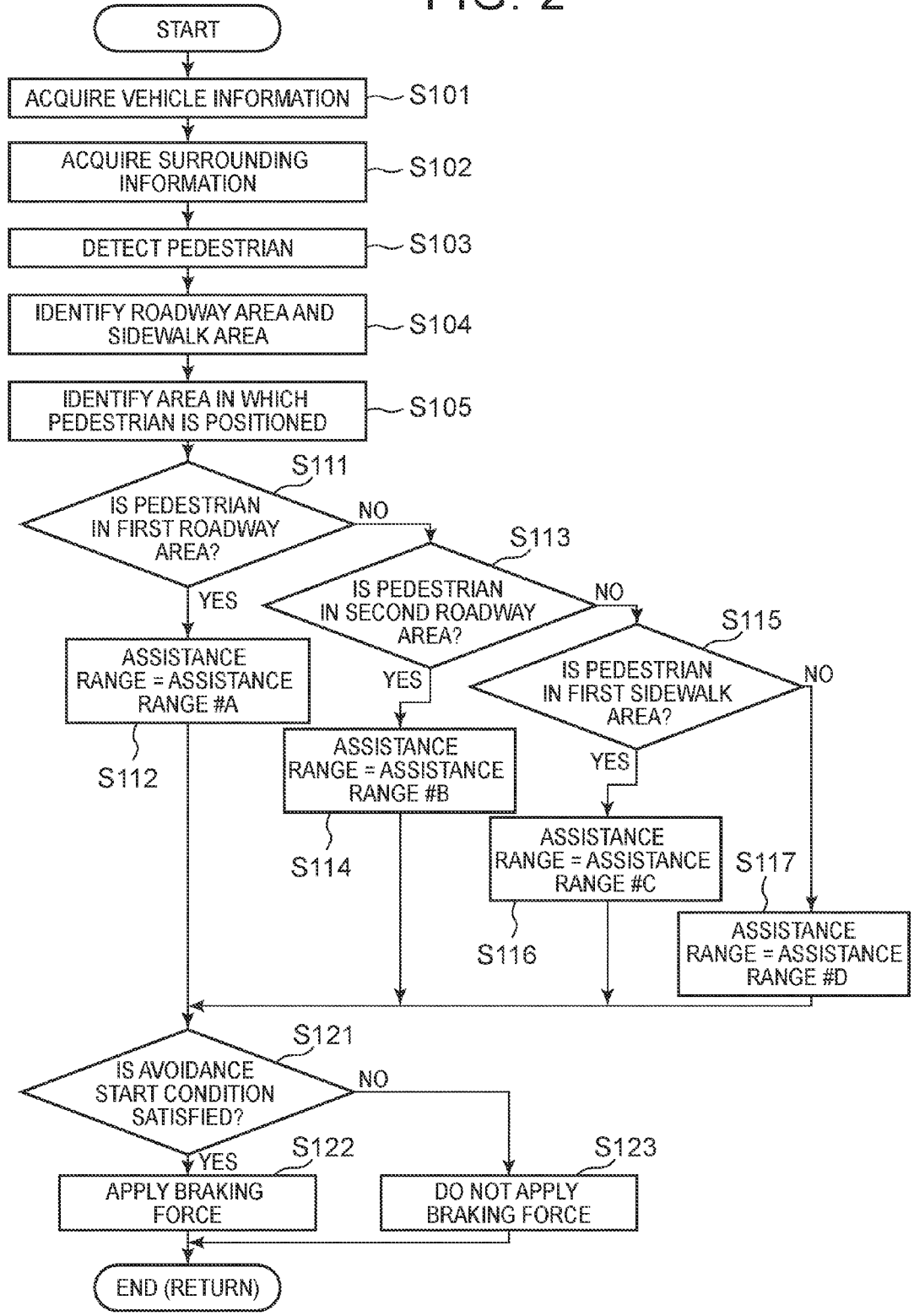
FIG. 2 is a flowchart showing a flow of the travel assistance operation in the first embodiment.

As shown in FIG. 2, the vehicle information acquisition unit 121 acquires the vehicle information (that is, the vehicle speed output from the vehicle speed sensor 113 and the yaw rate output from the yaw rate sensor 114) (step S101). In addition, the pedestrian detection unit 122 acquires the surrounding information (that is, the image information output from the camera 111 and the radar information output from the millimeter wave radar 112) (step S102).

After that, the pedestrian detection unit 122 detects a pedestrian positioned around the vehicle 1 based on the surrounding information (step S103). Since an existing detection method (for example, the detection method described in Japanese Patent No. 4637890) may be used as the pedestrian detection method that is based on the surrounding information, a detailed description thereof is omitted here.

In addition, the pedestrian detection unit 122 detects the position of the pedestrian (more specifically, the position on the traveling plane on which the vehicle 1 is travelling) based on the surrounding information. The "position of the pedestrian" detected in this step is typically the relative position of the pedestrian relative to the vehicle 1. In addition, the pedestrian detection unit 122 detects the actual moving speed of the pedestrian based on the surrounding information. The "actual moving speed of the pedestrian" detected in this step is typically the relative speed of the pedestrian relative to the vehicle 1. Since the method itself for detecting the position of the pedestrian and the actual moving speed based on the surrounding information may be an existing detection method (for example, the detection method described in Japanese Patent No. 4637890), a detailed description thereof will be omitted.

After that, the roadway/sidewalk identification unit 123 divides the surrounding area around the vehicle 1 (particularly, the surrounding area including the roadway and the sidewalk) into a plurality of types of segmented areas 141 based on the surrounding information (step S104). In the first embodiment, the plurality of types of segmented areas 141 include a first roadway area 141a, a second roadway area 141b, a first sidewalk area 141c, and a second sidewalk area 141d. Therefore, the roadway/sidewalk identification unit 123 identifies each of the first roadway area 141a, second roadway area 141b, first sidewalk area 141c, and second sidewalk area 141d from the surrounding area around the vehicle 1.

In the description below, the first roadway area 141a, second roadway area 141b, first sidewalk area 141c, and second sidewalk area 141d will be described in more detail with reference to FIG. 3. The upper half of FIG. 3 shows an image indicated by the image information obtained by capturing a certain surrounding area with the camera 111, and the lower half of FIG. 3 shows a virtual image showing the same surrounding area observed from above the vehicle 1.

Figure 3:
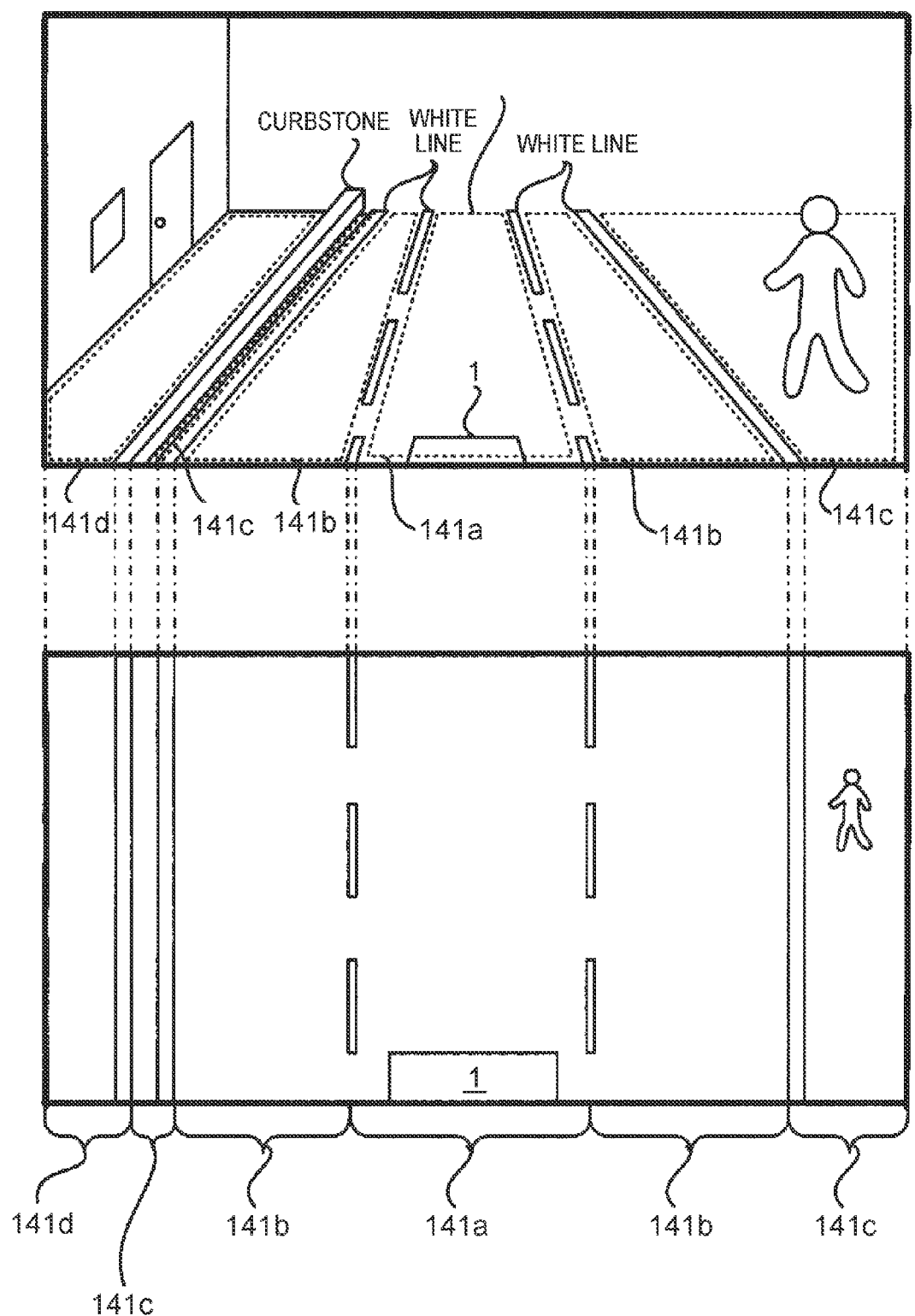
FIG. 3 is an image indicated by image information obtained by capturing a certain surrounding area with a camera and a plan view indicating a virtual image showing the same surrounding area observed from above the vehicle.

As shown in FIG. 3, the first roadway area 141a is an area included in the roadway and corresponding to the traveling lane in which the vehicle 1 is actually traveling. The "roadway" in the first embodiment means a road on which the vehicle 1 is permitted to travel. The first roadway area 141a is separated from the second roadway area 141b, the first sidewalk area 141c, and the second sidewalk area 141d by first dividing objects that indicate a traveling lane on the roadway (typically, the first dividing objects each extending along the front-back direction of the vehicle 1). The first roadway area 141a is an area surrounded by two adjacent first dividing objects. Such a first dividing object is, for example, a white line, a curbstone, a guardrail, a guard pole, a median strip, a wall, a fence, a building, and the like. FIG. 3 shows an example in which there is a single first roadway area 141a that is surrounded by two adjacent white lines and is located ahead of the vehicle 1 in its traveling direction.

The second roadway area 141b is an area included in the roadway and corresponding to another traveling lane different from the traveling lane in which the vehicle 1 is actually traveling. The second roadway area 141b is also separated from the first roadway area 141a, the first sidewalk area 141c, and the second sidewalk area 141d by the first dividing objects that indicate a traveling lane on the roadway. FIG. 3 shows an example in which there are two second roadway areas 141b each surrounded by two adjacent white lines and each adjacent to the first roadway area 141a on the right side and the left side of the first roadway area 141a, respectively.

The first sidewalk area 141c is an area corresponding to a sidewalk where there is not a physical boundary, capable of inhibiting the entry of the vehicle 1 from the roadway into the sidewalk, between the roadway and the sidewalk. The "sidewalk" in the first embodiment refers to a road on which the vehicle 1 is not allowed to travel (in other words, a road on which a pedestrian should walk). Therefore, the sidewalk in the first embodiment includes the so-called roadside belt. In addition, the state of "being capable of inhibiting the entry of the vehicle 1 from the roadway into the sidewalk" in the first embodiment includes the state in which the entry of the vehicle 1 from the roadway into the sidewalk can be completely inhibited and the state in which the speed or distance of the entry of the vehicle 1 from the roadway into the sidewalk can be reduced more easily than when there is not a physical boundary. Examples of such physical boundaries include a curbstone, a guardrail, a guard pole, or a chain. The first sidewalk area 141c is separated from the first roadway area 141a, the second roadway area 141b, and the second sidewalk area 141d by a second dividing object that can distinguish between the roadway and the sidewalk or can distinguish between different types of sidewalks (typically, a second dividing object extending along the front-back direction of the vehicle 1). The first sidewalk area 141c is an area adjacent to the first roadway area 141a, the second roadway area 141b or the second sidewalk area 141d via the second dividing object. Such second dividing objects include the above-mentioned physical boundaries (that is, a curbstone, a guardrail, a guard pole, a chain, etc.), a white line, and the like. Out of these second dividing objects, a white line is used, for example, to separate the first sidewalk area 141c from the other areas. FIG. 3 shows an example in which there are two first sidewalk areas 141c: one is the first sidewalk area 141c adjacent to the second roadway area 141b, which is the right-side second roadway area 141b in FIG. 3, via the white line, and the other is the first sidewalk area 141c (substantially equivalent to a roadside zone) adjacent to the second roadway area 141b, which is the left-side second roadway area 141b in FIG. 3, via the white line and is adjacent to the second sidewalk area 141d via the curbstone.

The second sidewalk area 141d is an area corresponding to a sidewalk where there is a physical boundary, capable of inhibiting the entry of the vehicle 1 from the roadway to the sidewalk, between the roadway and the sidewalk. The second sidewalk area 141d is also separated from the first roadway area 141a, the second roadway area 141b, and the first sidewalk area 141c by the second dividing object. The second sidewalk area 141d is an area adjacent to the first roadway area 141a, the second roadway area 141b, or the first sidewalk area 141c via the second dividing object. FIG. 3 shows an example in which there is a single second sidewalk area 141d adjacent to the second roadway area 141b via the curbstone (more specifically, adjacent to the first sidewalk area 141c via the curbstone).

For convenience of description, FIG. 3 shows the surrounding area that includes all of the first roadway area 141a, second roadway area 141b, first sidewalk area 141c, and second sidewalk area 141d. However, it is obvious that the surrounding area does not always include all of the first roadway area 141a, second roadway area 141b, first sidewalk area 141c, and second sidewalk area 14d.

The roadway/sidewalk identification unit 123 identifies the first and second dividing objects in the surrounding area based on the surrounding information. After that, the roadway/sidewalk identification unit 123 identifies the areas each separated by the first and second dividing objects. Then, the roadway/sidewalk identification unit 123 classifies the areas into the first roadway area 141a, second roadway area 141b, first sidewalk area 141c, and second sidewalk area 141d based on the types of the first and second dividing objects that indicate each area and on the positional relationship between each area and another area.

The roadway/sidewalk identification unit 123 may use the image information, which is one type of the surrounding information, to identify the first and second dividing objects. In this case, the roadway/sidewalk identification unit 123 may identify the first and second dividing objects by analyzing the image indicated by the image information. The roadway/sidewalk identification unit 123 may use the radar information, which is one type of the surrounding information, to identify the first and second dividing objects. However, when the radar information is used, it is difficult for the roadway/sidewalk identification unit 123 to directly identify a white line (or any other dividing object, typically, a two-dimensional dividing object, that does not have a three-dimensional size) that is one of the first and second dividing objects described above. However, where the white lines indicate the traveling lanes, there is a possibility that multiple vehicles are traveling in a row in the traveling lane. In this case, the roadway/sidewalk identification unit 123 may identify a plurality of vehicles (that is, objects) traveling in the front-to-rear direction of the vehicle 1 based on the radar information and, as a result, identify that there is a first or second dividing object extending along the front-to-rear direction of the vehicle 1 on both sides of the plurality of vehicles. Similarly, there is a possibility that a pedestrian smaller than the vehicle is walking on the sidewalk. In this case, the roadway/sidewalk identification unit 123 may identify the pedestrian and the vehicle based on the radar information and, as a result, identify that there is a second dividing object extending in the front-to-rear direction of the vehicle 1 between the area where the pedestrian is present and the area where the vehicle is present.

Returning again to FIG. 2, the pedestrian position identification unit 124 then determines in which area (first roadway area 141a, second roadway area 141b, first sidewalk area 141c, and second sidewalk area 141d) the pedestrian, detected in step S103, is positioned when detected in step S103 (step S105).

After that, the assistance range setting unit 125 sets the assistance range S based on the result identified in step S105. More specifically, if it is determined that the pedestrian is positioned in the first roadway area 141a (step S111: Yes), the assistance range setting unit 125 sets the assistance range #A as the assistance range S (step S112). If it is determined that the pedestrian is positioned in the second roadway area 141b (step S111: No, step S113: Yes), the assistance range setting unit 125 sets the assistance range #B as the assistance range S (step S114). If it is determined that the pedestrian is positioned in the first sidewalk area 141c (steps S111 and S113: No, step S115: Yes), the assistance range setting unit 125 sets the assistance range #C as the assistance range S (step S116). If it is determined that the pedestrian is positioned in the second sidewalk area 141d (steps S111, S113 and S115: No), the assistance range setting unit 125 sets the assistance range #D as the assistance range S (step S117). The assistance range #A is one specific example of the "first range" described above. The assistance range #B is one specific example of the "second range" described above. Each of the assistance ranges #C and #D is one specific example of the "third range" described above.

The assistance range S will now be described with reference to FIG. 4A. In addition, the relationship among the assistance range #A to the assistance range #D will be described with reference to FIGS. 4B to 4D.

Figure 4A:
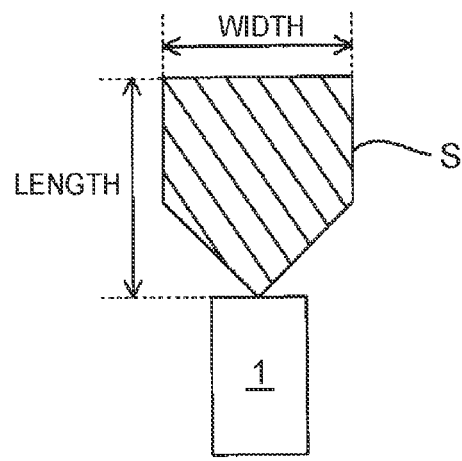
FIG. 4A is a plan view showing an assistance range.

As shown in FIG. 4A, the assistance range S is set around the vehicle 1 with the vehicle 1 as the base. The assistance range S is set, in particular, in front of the vehicle 1 (that is, forward relative to the traveling direction). In the example shown in FIG. 4A, the assistance range S has the shape of a pentagon, but the shape of the assistance range S is arbitrary. The assistance range S is set on the traveling plane on which the vehicle 1 is traveling.

The assistance range S is used to determine whether to perform (in other words, whether to start, whether to end, whether to continue) the collision avoidance operation described above. More specifically, the assistance range S is used by the operation determination unit 126 to determine to perform the collision avoidance operation if it is predicted that a pedestrian will be positioned therein within a predetermined time. Conversely, the assistance range S is used by the operation determination unit 126 to determine not to perform the collision avoidance operation if it is predicted that a pedestrian will not be positioned therein within a predetermined time. Therefore, the assistance range S is set around the vehicle 1 with the predicted future position of the vehicle 1 as the base (see FIGS. 5A to 5D).

The larger the assistance range S is, the easier it is for the pedestrian to be positioned in the assistance range S within a predetermined time and, therefore, the collision avoidance operation is more likely to be performed. The smaller the assistance range S is, the harder it is for the pedestrian to be positioned in the assistance range S within a predetermined time and, therefore, the collision avoidance operation is less likely to be performed. The size of the assistance range S depends mainly on the size along the width direction of the vehicle 1 (hereinafter referred to as "width") and on the size along the front-to-rear direction of the vehicle 1 (hereinafter referred to as "length"). As the width of the assistance range S increases, the assistance range S increases. As the length of the assistance range S increases, the assistance range S increases. If a pedestrian is positioned in front of the vehicle 1 and if the distance between the vehicle 1 and the pedestrian along the front-to-rear direction of the vehicle 1 is equal to or less than the length of the assistance range S, the pedestrian should be positioned in the assistance range S. Therefore, the size of the assistance range S along the front-to-rear direction of the vehicle 1 (that is, the length) may be referred to as the distance of the assistance range S.

Figure 4B:
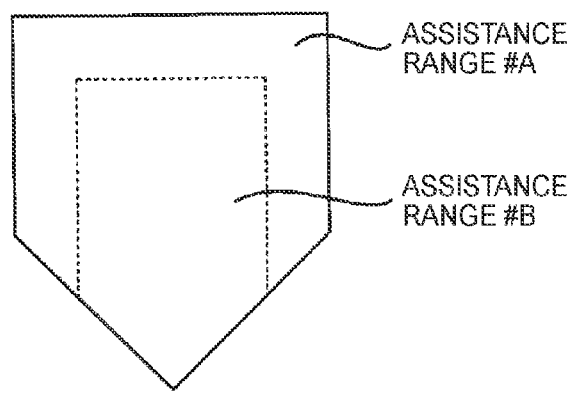
FIG. 4B is a plan view showing a relationship between different types of assistance ranges.

As shown in FIG. 4B, the assistance range #A is larger than the assistance range #B. The width of the assistance range #A is larger than the width of the assistance range #B. The width of the assistance range #A corresponds to a width obtained by expanding the width of the assistance range #B equally on both sides. The length of the assistance range #A is longer than the length of the assistance range #B. The assistance range #A contains all of the assistance range #B.

Figure 4C:
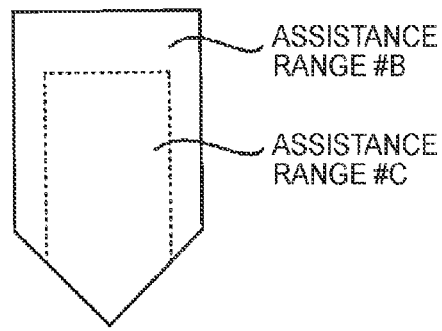
FIG. 4C is a plan view showing a relationship between different types of assistance ranges.

As shown in FIG. 4C, the assistance range #B is larger than the assistance range #C. The width of the assistance range #B is larger than the width of the assistance range #C. The width of the assistance range #B corresponds to a width obtained by expanding the width of the assistance range #C equally on both sides. The length of the assistance range #B is longer than the length of the assistance range #C. The assistance range #B contains all of the assistance range #C.

Figure 4D:
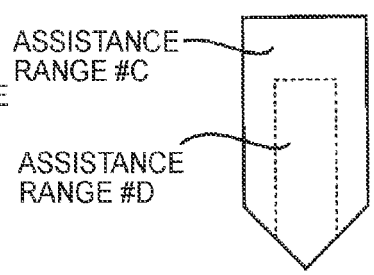
FIG. 4D is a plan view showing a relationship between different types of assistance ranges.

As shown in FIG. 4D, the assistance range #C is larger than the assistance range #D. The width of the assistance range #C is larger than the width of the assistance range #D. The width of the assistance range #C corresponds to a width obtained by expanding the width of the assistance range #D equally on both sides. The length of the assistance range #C is longer than the length of the assistance range #D. The assistance range #C contains all of the assistance range #D.

Returning again to FIG. 2, the operation determination unit 126 then determines whether the avoidance start condition is satisfied (step S121). The avoidance start condition is a condition that the pedestrian will be positioned in the assistance range S, which was set in step S112, S114, S116 or S117, within a predetermined time (that is, a period of time from the present time until a predetermined time elapses). Therefore, the operation of determining whether the avoidance start condition is satisfied corresponds to the operation of predicting whether the pedestrian will be positioned in the assistance range S within a predetermined time.

The following describes the operation performed by the operation determination unit 126 to determine whether the avoidance start condition is satisfied, with reference to FIGS. 5A to 5E that show the positional relationship between the vehicle 1 and the pedestrian.

The operation determination unit 126 predicts the future position of the vehicle 1 (for example, the position of the vehicle 1 during the period until a predetermined time elapses) based on the vehicle information. For example, as the future position, the operation determination unit 126 predicts the position to which the vehicle 1 will move (in other words, the movement range) when the vehicle speed and the yaw rate, indicated by the vehicle information, are maintained. In addition, based on the position of the pedestrian and the actual moving speed detected by the pedestrian detection unit 122, the operation determination unit 126 predicts the future position of the pedestrian (for example, the position of the pedestrian during the period until a predetermined time elapses). For example, as the future position, the operation determination unit 126 predicts the position to which the pedestrian is predicted to move (in other words, the movement range) when the actual moving speed is maintained. Since the prediction method of the future position of the vehicle 1 based on the vehicle information and the prediction method of the position of the future position of the pedestrian based on the surrounding information may be an existing prediction method (for example, the prediction method described in Japanese Patent No. 4637890), a detailed description thereof is omitted here. As a result, the position of the vehicle 1 and the position of the pedestrian at the time of a future predetermined time are predicted as shown in FIGS. 5A to 5D. FIGS. 5A to 5D each show the future positional relationship between the vehicle 1 moving toward the upper side of the page and the pedestrian moving toward the left side of the page. FIG. 5A shows each of the positions of the vehicle 1 and the pedestrian at future time t51. FIG. 5B shows each of the positions of the vehicle 1 and the pedestrian at future time t52 ahead of time t51. FIG. 5C shows each of the positions of the vehicle 1 and pedestrians at future time t53 that is ahead of time t52. FIG. 5D shows each of the positions of the vehicle 1 and the pedestrian at future time t54 that is ahead of time t53.

As described above, the position and the actual moving speed of the pedestrian may be a relative position and a relative speed relative to the vehicle 1, respectively. In this case, the relationship between the future position of the vehicle 1 and the future position of the pedestrian, shown in FIGS. 5A to 5D, is equivalent to the relationship shown in FIG. 5E in the relative coordinate system where the vehicle 1 is always positioned at the origin. For convenience of description, the positional relationship between the vehicle 1 and the pedestrian will be described below in the relative coordinate system.

After that, the operation determination unit 126 predicts whether the pedestrian will be positioned in the assistance range S within a predetermined time (for example, several hundred milliseconds to several seconds) based on the future position of each of the vehicle 1 and the pedestrian. For example, in the example shown in FIGS. 5A to 5E, the pedestrian is not positioned in the assistance range S from time t51 to time t53. On the other hand, at time t54, the pedestrian is positioned in the assistance range S. Therefore, if the period from the present to the time at which time t54 will elapse is longer than the predetermined time, it is predicted that the pedestrian will not be positioned in the assistance range S within the predetermined time (that is, the avoidance start condition is not satisfied). On the other hand, if the period from the present to the time at which time t54 will elapse is equal to or shorter than the predetermined time, it is predicted that the pedestrian will be positioned in the assistance range S within the predetermined time (that is, the avoidance start condition is satisfied).

Returning again to FIG. 2, when it is predicted as a result of the determination in step S121 that the avoidance start condition is satisfied (step S121: Yes), it is estimated that the possibility of near-future collision between the vehicle 1 and the pedestrian is relatively higher than when it is predicted that the avoidance start condition is not satisfied. Therefore, in this case, the travel assistance unit 127 controls the brake actuator 13 so that the collision avoidance operation is performed. As a result, braking force that can assist in collision avoidance between the vehicle 1 and the pedestrian is applied to the vehicle 1 (step S122). After that, the collision avoidance assistance operation shown in FIG. 2 is terminated. After that, while applying braking force, the ECU 12 starts the collision avoidance assistance operation, shown in FIG. 2, again after a predetermined period elapses.

Figure 6:
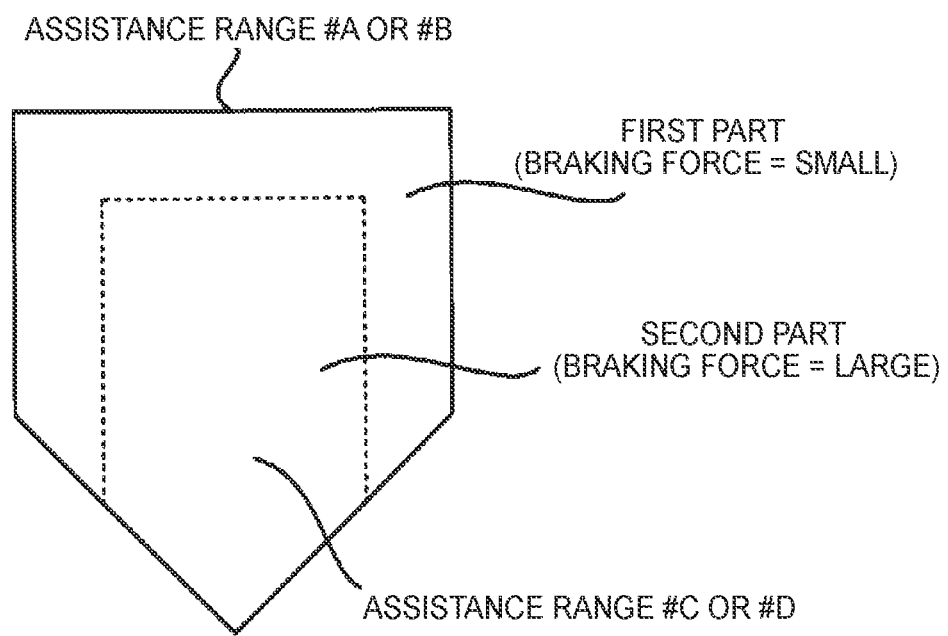
FIG. 6 is a plan view showing a relationship between an assistance range that is set when a pedestrian is positioned on a roadway and an assistance range that is set when a pedestrian is positioned on a sidewalk.

The assistance range #A or #B, which is set as the assistance range S when the pedestrian is positioned in the first roadway area 141a or in the second roadway area 141b respectively, corresponds to an assistance range obtained by expanding the assistance range #C or #D which is set as the assistance range S when the pedestrian is positioned in the first sidewalk area 141c or the second sidewalk area 141d. Therefore, as shown in FIG. 6, each of the assistance ranges #A and #B includes a first part, in which overlap does not occur with the assistance range #C or #D, and a second part in which overlap occurs with the assistance range #C or #D. In the first embodiment, if the assistance range #A or #B is set as the assistance range S and it is predicted that the avoidance start condition will be satisfied, the operation determination unit 126 also predicts whether the pedestrian will be positioned in the first part within the predetermined time and whether the pedestrian will be positioned in the second part within the predetermined time. The travel assistance unit 127 sets the magnitude of braking force, which is applied if it is predicted that the pedestrian will be positioned in the first part within the predetermined time and that the pedestrian will not be in the second part within the predetermined time, smaller than the magnitude of braking force which is applied if it is predicted that the pedestrian will be positioned in the second part within the predetermined time.

On the other hand, when it is predicted as a result of the determination in step S121 that the avoidance start condition is not satisfied (step S121: No), it is estimated that the possibility of near-future collision between the vehicle 1 and the pedestrian is relatively lower than when it is predicted that the avoidance start condition is satisfied (or it is estimated that there is no possibility of collision). Therefore, in this case, the travel assistance unit 127 controls the brake actuator 13 so that the collision avoidance operation is not performed. As a result, braking force that can assist in the collision avoidance between the vehicle 1 and the pedestrian is not applied to the vehicle 1 (step S123). After that, the collision avoidance assistance operation shown in FIG. 2 is terminated. After that, while not applying braking force, the ECU 12 starts the collision avoidance assistance operation, shown in FIG. 2, again after a predetermined period elapses.

(1-3) Technical Effects of the Travel Assistance Operation in the First Embodiment As described above, if the avoidance start condition is satisfied (that is, there is a possibility, or a relatively high possibility, that the vehicle 1 and a pedestrian will collide), the ECU 12 performs the collision avoidance operation. Therefore, the ECU 12 can assist in collision avoidance between the vehicle 1 and the pedestrian.

In particular, in the first embodiment, the size of the assistance range S varies according to the type of the segmented area 141 in which a pedestrian is positioned. It is estimated here that the possibility that a pedestrian positioned in the first roadway area 141a will collide with the vehicle 1 is higher than the possibility that a pedestrian positioned in the second roadway area 141b will collide with the vehicle 1. Similarly, it is estimated that the possibility that a pedestrian positioned in the second roadway area 141b will collide with the vehicle 1 is higher than the possibility that a pedestrian positioned in the first sidewalk area 141c will collide with the vehicle 1. Similarly, it is estimated that the possibility that a pedestrian positioned in the first sidewalk area 141c will collide with the vehicle 1 is higher than the possibility that a pedestrian positioned in the second sidewalk area 141d will collide with the vehicle 1. Therefore, in the first embodiment, it can be said that the size of the assistance range S is adjusted, considering the relationship between the possibility of collision between the pedestrian and the vehicle 1 and each segmented area 141. More specifically, the higher the possibility that the vehicle 1 will collide with the pedestrian is, the larger the assistance range S becomes. The larger the assistance range S is, the higher is the possibility that a pedestrian will be positioned in the assistance range S within a predetermined time. That is, as the assistance range S increases, the avoidance start condition is more likely to be satisfied. Therefore, the collision avoidance operation is more likely to be performed as the possibility of collision between the vehicle 1 and the pedestrian increases. As a result, as the possibility of collision between the vehicle 1 the pedestrian increases, the collision avoidance operation is performed more appropriately so that collision avoidance between the vehicle 1 and the pedestrian is further assisted. On the other hand, as the possibility of collision between the vehicle 1 and the pedestrian decreases, the collision avoidance operation is less likely to be performed. This leads to a reduction in the annoyance felt by passengers due to unnecessary collision avoidance operations (that is, application of braking force) that are performed relatively frequently even when the possibility of collision between the vehicle 1 and a pedestrian is relatively low. As described above, the travel assistance device in the first embodiment assists in collision avoidance between the vehicle 1 and a pedestrian considering whether the pedestrian is positioned on a roadway or on a sidewalk.

Figure 7A:
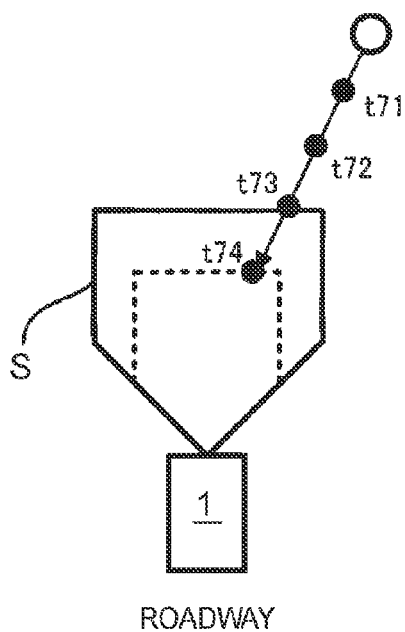
FIG. 7A is a plan view showing a relationship between the future position of a vehicle and the future position of a pedestrian when the pedestrian is on a roadway.
Figure 7B:
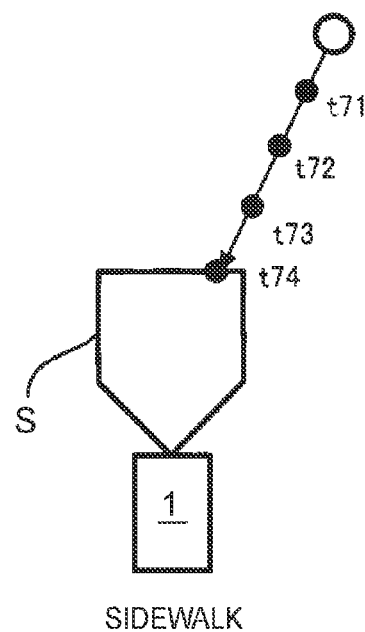
FIG. 7B is a plan view showing a relationship between the future position of a vehicle and the future position of a pedestrian when the pedestrian is on a sidewalk.
Figure 7C:
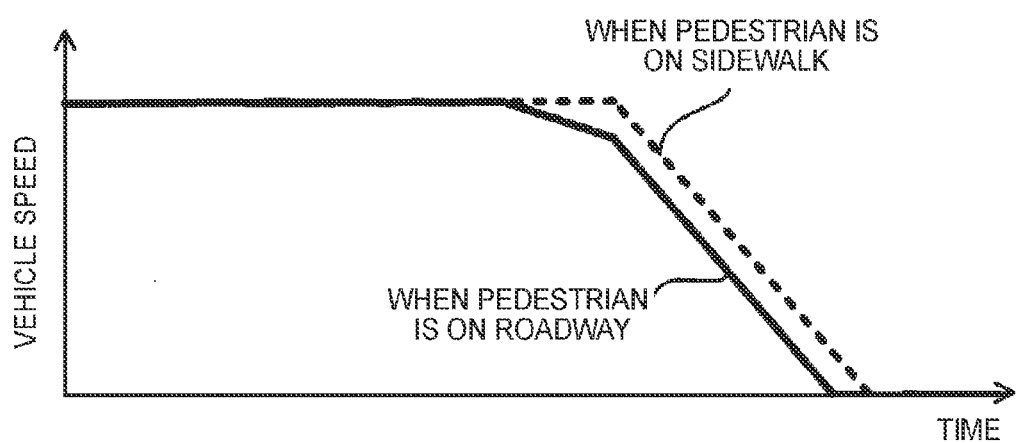
FIG. 7C is a timing diagram showing a temporal change in the vehicle speed under the situation where the travel assistance operation in the first embodiment is being performed.

The following describe, for reference, the difference between the collision avoidance operation performed when a pedestrian is positioned on a roadway (that is, the first roadway area 141*a* or the second roadway area 141*b*) and the collision avoidance operation performed when a pedestrian is positioned on a sidewalk (that is, first sidewalk area 141*c* or second sidewalk area 141*d*) with reference to FIGS. 7A to 7C.

FIG. 7A shows the relationship between the future position of the vehicle 1 and the future position of the pedestrian when the pedestrian is on a roadway. FIG. 7B shows the relationship between the future position of the vehicle 1 and the future position of the pedestrian when the pedestrian is on a sidewalk. In FIGS. 7A and 7B, it is assumed that the pedestrian on the roadway and the pedestrian on the sidewalk are walking in the same direction from the same relative position at the same relative speed. In this case, when the pedestrian is positioned on the roadway, the pedestrian is positioned in the assistance range S at time t73 as shown in FIG. 7A. On the other hand, when the pedestrian is positioned on the sidewalk, the pedestrian will not be positioned in the assistance range S at time t73 but is positioned in the assistance range S at time t74, which is later than time t73, as shown in FIG. 7B since the assistance range S is relatively small. Therefore, when the pedestrian is positioned on the sidewalk, the time at which the avoidance start condition is satisfied is delayed. For this reason, the application of braking force is started at a relatively earlier time when the pedestrian is positioned on the roadway, whereas the application of braking force is started at a relatively later time when the pedestrian is positioned on the sidewalk. As a result, as shown in FIG. 7C, the vehicle speed begins to decrease at a relatively earlier time when the pedestrian is positioned on the roadway while the vehicle speed begins to decrease at a relatively later time when the pedestrian is positioned on the sidewalk. Therefore, for a pedestrian who is positioned on the roadway and therefore has a relatively high possibility of collision with the vehicle 1, the collision avoidance operation is started at a relatively earlier time, meaning that collision between the pedestrian and the vehicle 1 is avoided more appropriately. On the other hand, for a pedestrian who is positioned on the sidewalk and therefore has a relatively low possibility of collision with the vehicle 1, the collision avoidance operation is started at a relatively later time, leading to a reduction in the annoyance felt by the passengers due to the application of braking force under the situation where the possibility of collision with the pedestrian is relatively low.

Furthermore, in the first embodiment, the braking force applied to the first part, which is included in the assistance range #A or #B but does not overlap with the assistance range #C or #D, is smaller than the braking force applied to the second part which is included in the assistance range #A or #B and overlaps with the assistance range C or #D. In this case, because the assistance ranges #A and #B are larger than the assistance ranges #C and #D respectively, the braking force for assisting in collision avoidance between the vehicle 1 and the object is more likely to be applied when the pedestrian is positioned in the first roadway area 141*a* or the second roadway area 141*b*. However, the application of excessive braking force may make the passengers feel annoyed. On the other hand, considering that the second part corresponds to the assistance range #C or #D and that the first part corresponds to an area created by expanding the assistance range #C or #D, it is estimated that the possibility that a pedestrian positioned in the first part will collide with the vehicle 1 is lower than the possibility that a pedestrian positioned in the second part will collide with the vehicle 1. Therefore, since excessive braking force is not applied when the pedestrian is positioned in the first part where the possibility of collision with the vehicle 1 is relatively low (in other words, when the pedestrian is not positioned in the second part where the possibility of collision with the vehicle 1 is relatively high), the annoyance that the passengers feel is reduced.

As described above, the setting of the assistance range S includes the setting of the width of the assistance range S. In this case, as the width of the assistance range S increases, it becomes easier to assist in collision avoidance with a pedestrian positioned in the lateral direction of the vehicle 1. Therefore, depending on the setting of the assistance range S, it is also possible in the first embodiment to assist in collision avoidance, for example, with a pedestrian who is not positioned on the traveling route of the vehicle 1 but may collide with the vehicle 1 (typically, a pedestrian positioned next to the future traveling route of the vehicle). It is also possible to assist in collision avoidance with a pedestrian who is walking in parallel to the vehicle 1 along the future traveling path of the vehicle 1 or a pedestrian who is standing next to the future traveling path of the vehicle 1 (typically, avoidance of collision with a pedestrian who may jump out from the lateral direction).

(2) Vehicle 2 in a Second Embodiment

Next, a vehicle 2 in a second embodiment will be described. The vehicle 2 in the second embodiment is a vehicle to which an embodiment of the "first travel assistance device that sets a movement range" described above is applied.

(2-1) Configuration of Vehicle 2 in the Second Embodiment

The configuration of the vehicle 2 in the second embodiment will be described with reference to FIG. 8. It should be noted that the same reference numerals are attached to the same components as those of the vehicle 1 in the first embodiment, and a detailed description thereof will be omitted.

Figure 8:
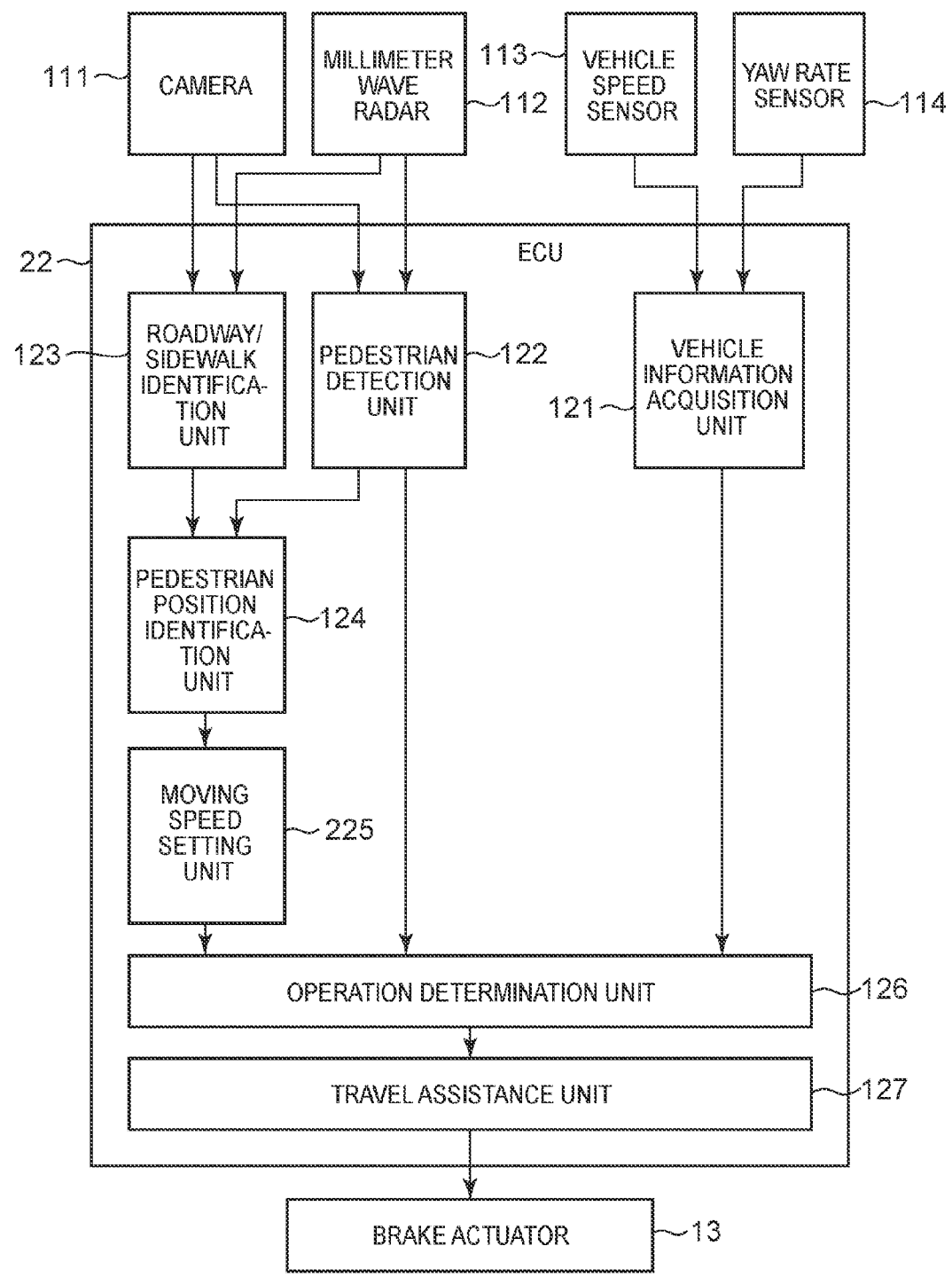
FIG. 8 is a block diagram showing a configuration of a vehicle in a second embodiment.

As shown in FIG. 8, the vehicle 2 in the second embodiment is different from the vehicle 1 in the first embodiment in that an ECU 22 is provided instead of the ECU 12. The ECU 22 is different from the ECU 12 in that a moving speed setting unit 225, which is one specific example of the "setting unit" described above, is provided instead of the assistance range setting unit 125. The moving speed setting unit 225 sets the moving speed of a pedestrian, which is assumed when the operation determination unit 126 predicts the future position of the pedestrian (hereinafter referred to as the "assumed speed"), based on the identification result of the pedestrian position identification unit 124. The travel assistance operation in the second embodiment will be further described below with focus on the operation of the moving speed setting unit 225.

(2-2) Flow of the Travel Assistance Operation in the Second Embodiment

Figure 9:
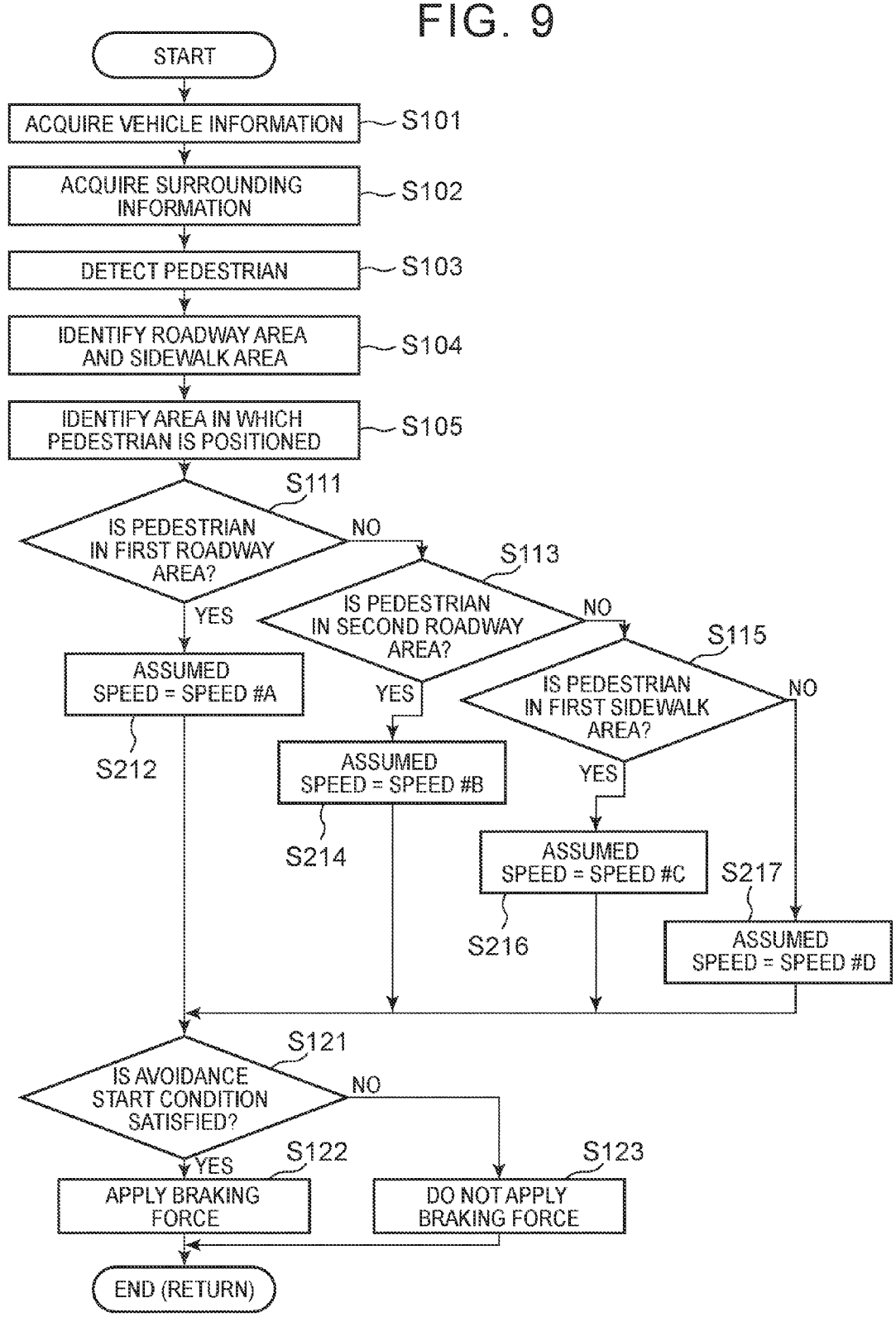
FIG. 9 is a flowchart showing a flow of the travel assistance operation in the second embodiment.

The flow of the travel assistance operation in the second embodiment will be described with reference to FIG. 9. The travel assistance operation shown in FIG. 9 is repeatedly performed by the ECU 22 at predetermined intervals. The same processing steps as those in the travel assistance operation in the first embodiment are denoted by the same step numbers, and a detailed description thereof will be omitted.

As shown in FIG. 9, the processing from step S101 to step S105 is performed also in the second embodiment as in the first embodiment. In the second embodiment, the moving speed setting unit 225 sets an assumed speed based on the identification result, identified in step S105, after the processing in step S105 is performed. More specifically, if it is identified that the pedestrian is positioned in the first roadway area 141*a* (step S111: Yes), the moving speed setting unit 225 sets the moving speed #A as the assumed speed (step S212). If it is identified that the pedestrian is positioned in the second roadway area 141*b* (step S113: Yes), the moving speed setting unit 225 sets the moving speed #B, which is slower than the moving speed #A, as the assumed speed (step S214). If it is identified that the pedestrian is positioned in the first sidewalk area 141*c* (step S115: Yes), the moving speed setting unit 225 sets the moving speed #C, which is slower than the moving speed #B, as the assumed speed (step S216). If it is identified that the pedestrian is positioned in the second sidewalk area 141*d* (step S115: No), the moving speed setting unit 225 sets the moving speed #D, which is slower than the moving speed #C, as the assumed speed (step S217). The moving speed #A is one specific example of the "first speed" described above. The moving speed #B is one specific example of the "second speed" described above. The moving speeds #C and #D are each one specific example of the "third speed" described above.

The moving speeds #A to #D may each be a predetermined moving speed. For example, the moving speed #A may be 3 m/s, the moving speed #B may be 2 m/s, the moving speed #C may be 1 m/s, and the moving speed #D may be 0.5 m/s. Instead of this, the moving speeds #A to #D may each be set appropriately based on the pedestrian's actual moving speed detected by the pedestrian detection unit 122. For example, the moving speed #A may be set to a speed obtained by adding a first offset amount to the actual moving speed, the moving speed #B may be set to a speed obtained by adding a second offset amount, which is smaller than the first offset amount, to the actual moving speed, the moving speed #C may be set to a speed obtained by adding a third offset amount, which is smaller than the second offset amount, to the actual moving speed, and the moving speed #D may be set to a speed obtained by adding a fourth offset amount, which smaller than the third offset amount, to the actual moving speed. Each of the first and second offset amounts is preferably a positive offset amount, but may be a negative offset amount. Each of the third and fourth offset amounts may be a positive offset amount or a negative offset amount.

After that, the operation determination unit 126 determines whether the avoidance start condition is satisfied (step S121). In the second embodiment, it should be noted that the operation determination unit 126 uses a predetermined default assistance range (for example, one of the assistance ranges #A to #D described above) as the assistance range S regardless of the determination results in steps S111, S113 and S115. Furthermore, in the second embodiment, the operation determination unit 126 assumes that a pedestrian will move at the assumed speed, which was set in steps S212, S214, S216 or S217, when predicting the future position of the pedestrian. After that, the same processing as in the first embodiment is performed.

(2-3) Technical Effects of Travel Assistance Operation in the Second Embodiment As described above, the ECU 22 performs the collision avoidance operation if the avoidance start condition is satisfied. Therefore, the ECU 22 can assist in collision avoidance between the vehicle 2 and a pedestrian.

In particular, in the second embodiment, the assumed speed varies according to the type of the segmented area 141 in which the pedestrian is positioned. In other words, it can be said that the assumed speed is adjusted considering the relationship between the possibility of collision between the pedestrian and the vehicle 2 and each segmented area 141. More specifically, the higher the possibility of collision between the vehicle 2 and the pedestrian is, the higher the assumed speed becomes. The higher the assumed speed is, the larger is the movement range where the pedestrian is expected to move in the same period of time. More specifically, the movement range of a pedestrian whose estimated speed is set to the moving speed #A (that is, a pedestrian positioned in the first roadway area 141*a*) is larger than the movement range of a pedestrian whose estimated speed is set to the moving speed #B (that is, a pedestrian positioned in the second roadway area 141*b*). The movement range of a pedestrian whose assumed speed is set to the moving speed #B (that is, a pedestrian positioned in the second roadway area 141*b*) is larger than the movement range of a pedestrian whose assumed speed is set to the moving speed #C (that is, a pedestrian positioned in the first sidewalk area 141*c*). The movement range of a pedestrian whose assumed speed is set to the moving speed #C (that is, a pedestrian positioned in the first sidewalk area 141*c*) is larger than the movement range of a pedestrian whose assumed speed is set to the moving speed #D (that is, a pedestrian positioned in the second sidewalk area 141*d*). Therefore, as the assumed speed increases, there is a higher possibility that a pedestrian will be positioned in the assistance range S within a predetermined time. This means that the collision avoidance operation is more likely to be performed as the possibility of collision between the vehicle 2 and the pedestrian increases. Therefore, as in the first embodiment, the travel assistance device in the second embodiment also assists in collision avoidance between the vehicle 2 and a pedestrian considering whether the pedestrian is positioned on a roadway or on a sidewalk.

Figure 10A:
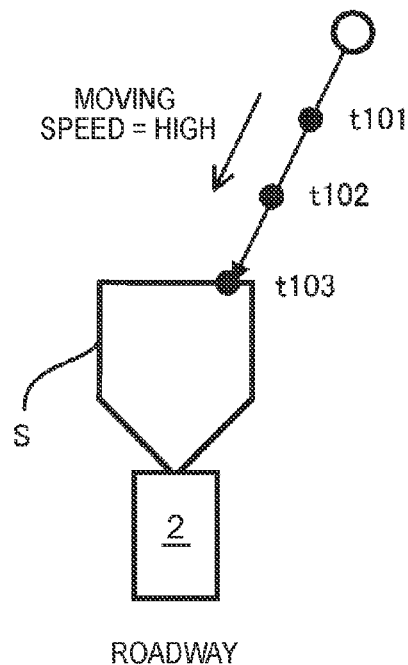
FIG. 10A is a plan view showing a relationship between the future position of a vehicle and the future position of a pedestrian when the pedestrian is on a roadway.
Figure 10B:
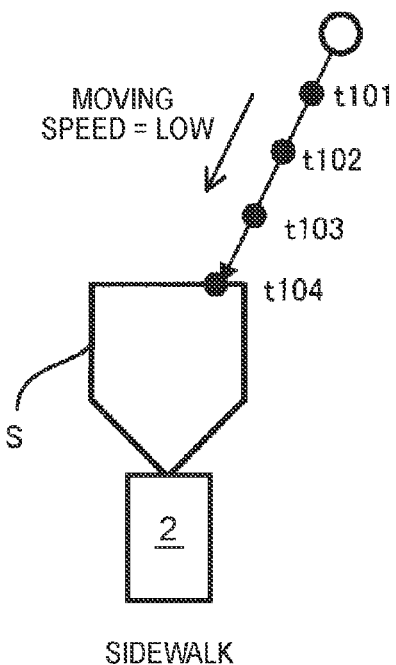
FIG. 10B is a plan view showing a relationship between the future position of a vehicle and the future position of a pedestrian when the pedestrian is on a sidewalk.
Figure 10C:
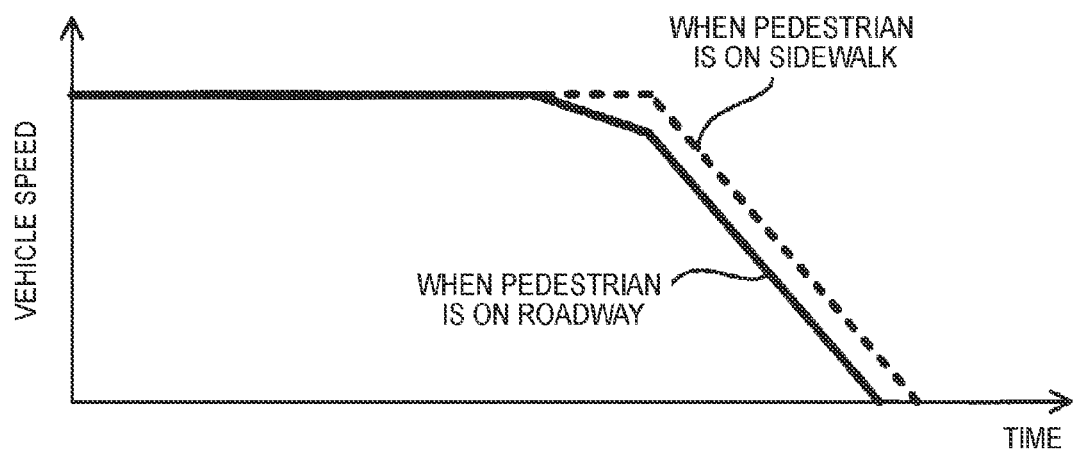
FIG. 10C is a timing diagram showing a temporal change in the vehicle speed under the situation where the travel assistance operation in the second embodiment is being performed.

The following describes, for reference, the difference between the collision avoidance operation performed when a pedestrian is positioned on a roadway (that is, the first roadway area 141*a* or the second roadway area 141*b*) and the collision avoidance operation performed when a pedestrian is positioned on a sidewalk (that is, the first sidewalk area 141*c* or the second sidewalk area 141*d*) with reference to FIGS. 10A to 10C.

FIG. 10A shows the relationship between the future position of the vehicle 2 and the future position of a pedestrian when the pedestrian is on the roadway. FIG. 10B shows the relationship between the future position of the vehicle 2 and the future position of a pedestrian when the pedestrian is on the sidewalk. In FIGS. 10A and 10B, it is assumed that the pedestrian on the roadway and the pedestrian on the sidewalk are walking in the same direction from the same relative position. In this case, when the pedestrian is positioned on the roadway, the pedestrian is positioned in the assistance range S at time t103 as shown in FIG. 10A. On the other hand, when the pedestrian is positioned on the sidewalk, the pedestrian is not positioned in the assistance range S at time t103 but is positioned in the assistance range S at time t104, which is later than time t103, as shown in FIG. 10B, since the assumed speed is relatively low. For this reason, in the second embodiment, too, the vehicle speed begins to decrease at a relatively earlier time when the pedestrian is positioned on the roadway while the vehicle speed begins to decrease at a relatively later time when the pedestrian is positioned on the sidewalk, as in the first embodiment.

(3) Vehicle 3 in a Third Embodiment

Next, a vehicle 3 of the third embodiment will be described. The vehicle 3 in the third embodiment is a vehicle to which an embodiment of the "second travel assistance device" described above is applied.

(3-1) Configuration of Vehicle 3 in the Third Embodiment

The configuration of the vehicle 3 in the third embodiment will be described with reference to FIG. 11. It should be noted that the same reference numerals are attached to the same components as those of the vehicle 1 in the first embodiment, and a detailed description thereof will be omitted.

Figure 11:
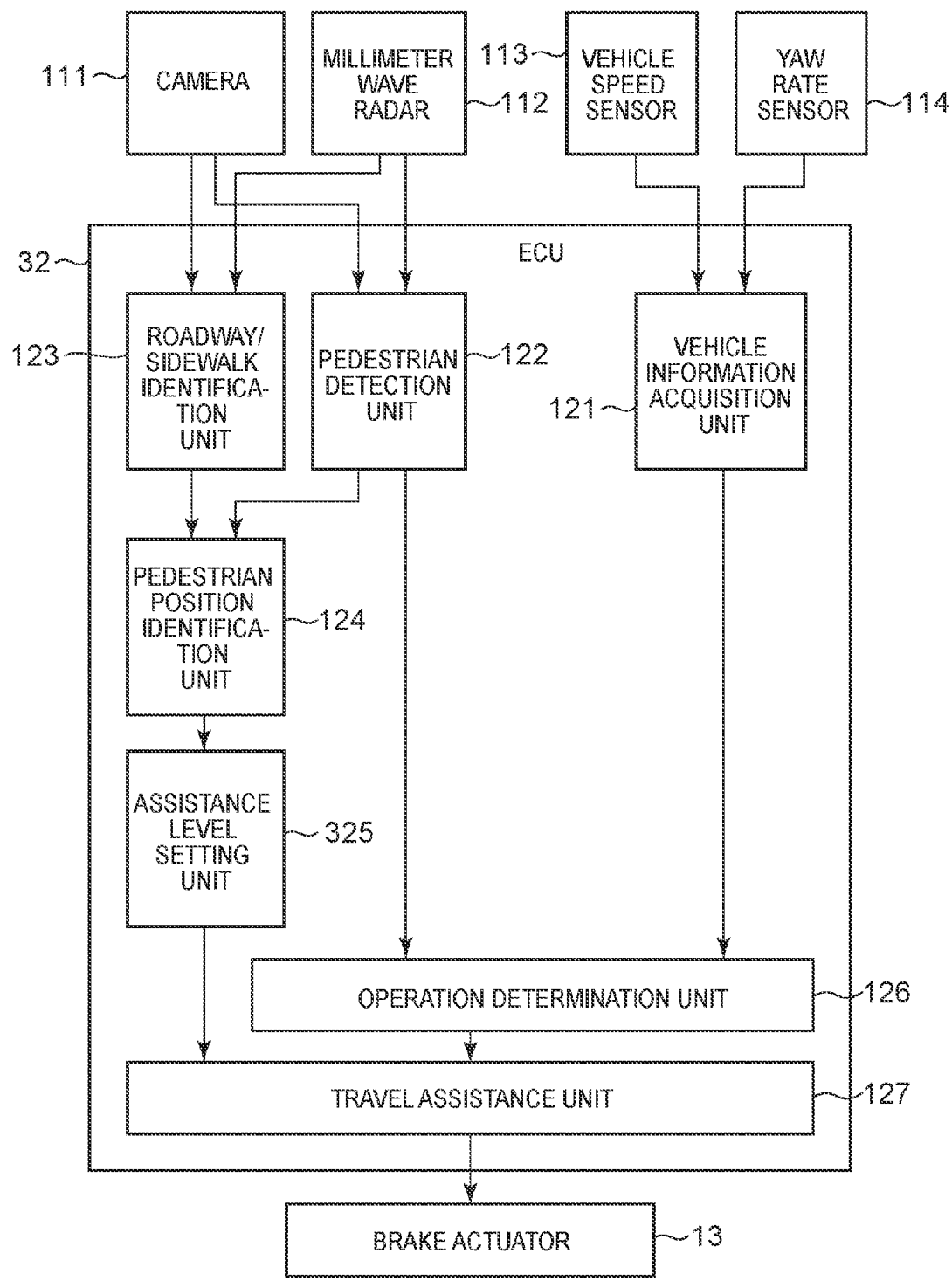
FIG. 11 is a block diagram showing a configuration of a vehicle in a third embodiment.

As shown in FIG. 11, the vehicle 3 in the third embodiment is different from the vehicle 1 in the first embodiment in that an ECU 32 is provided instead of the ECU 12. The ECU 32 is different from the ECU 12 in that an assistance level setting unit 325 is provided instead of the assistance range setting unit 125. The assistance level setting unit 325 sets an assistance level that defines the execution mode of the collision avoidance operation, based on the identification result of the pedestrian position identification unit 124. The travel assistance operation in the third embodiment will be further described below with focus on the operation of the assistance level setting unit 325.

(3-2) Flow of the Travel Assistance Operation in the Third Embodiment

As shown in FIG. 12, the processing from step S101 to step S105 is performed also in the third embodiment as in the first embodiment. In the third embodiment, the assistance level setting unit 325 sets an assistance level based on the identification result, identified in step S105, after the processing in step S105 is performed. More specifically, if it is identified that the pedestrian is positioned in the first roadway area 141a (step S111: Yes), the assistance level setting unit 325 sets the level #A as the assistance level (step S312). If it is identified that the pedestrian is positioned in the second roadway area 141b (step S113: Yes), the assistance level setting unit 325 sets the level #B as the assistance level (step S314). If it is identified that the pedestrian is positioned in the first sidewalk area 141c (step S115: Yes), the assistance level setting unit 325 sets the level #C as the assistance level (step S316). If it is identified that the pedestrian is positioned in the second sidewalk area 141d (step S115: No), the assistance level setting unit 325 sets the level #D as the assistance level (step S317).

The collision avoidance operation is an operation to apply braking force as described above. Therefore, it can be said that the assistance level that defines the execution mode of the collision avoidance operation substantially defines the application mode of braking force. Furthermore, when braking force is applied, the vehicle 3 decelerates. Therefore, it can be said that the assistance level defines the deceleration mode of the vehicle 3. In this case, the level #A is an assistance level capable of decelerating the vehicle 3 earlier as compared with the level #B. The level #B is an assistance level capable of decelerating the vehicle 3 earlier compared with the level #C. The level #C is an assistance level capable of decelerating the vehicle 3 earlier compared with the level #D. The "decelerating the vehicle 3 earlier" in the third embodiment may include causing the vehicle 3 to terminate deceleration earlier. The "causing the vehicle 3 to terminate deceleration earlier" may be causing the vehicle 3 to stop earlier, for example.

The "operation to decelerate the vehicle 3 earlier" in the third embodiment may include an operation to increase the deceleration of the vehicle 3 and, thereby, reduce (that is, shorten) the time required for the vehicle speed of the vehicle 3 to decrease to a predetermined speed. To change the deceleration of the vehicle 3 according to the assistance level, the assistance level may define at least one of the maximum deceleration of the vehicle 3 and the jerk of the vehicle 3. For example, the maximum deceleration defined by the level #A is greater than the maximum deceleration defined by level #B. For example, the maximum deceleration defined by the level #B is greater than the maximum deceleration defined by the level #C. For example, the maximum deceleration defined by the level #C is greater than the maximum deceleration defined by the level #D. This also applies to the jerk.

The "operation to decelerate the vehicle 3 earlier" in the third embodiment may include an operation to start the deceleration of the vehicle 3 at an earlier time. To change the time to start the deceleration of the vehicle 3 according to the assistance level, the assistance level may define a time to start the collision avoidance operation. For example, the time defined by the level #A is earlier than the time defined by the level #B. For example, the time defined by the level #B is earlier than the time defined by the level #C. For example, the time defined by the level #C is earlier than the time defined by the level #D.

After that, the operation determination unit 126 determines whether the avoidance start condition is satisfied (step S121). In the third embodiment, it should be noted that the operation determination unit 126 uses a predetermined default assistance range (for example, one of the assistance ranges #A to #D described above) as the assistance range S regardless of the determination results in steps S111, S113 and S115.

If it is predicted that the avoidance start condition is satisfied as a result of the determination in step S121 (step S121: Yes), the travel assistance unit 127 controls the brake actuator 13 so that the collision avoidance operation is performed. In the third embodiment, the travel assistance unit 127 controls the brake actuator 13 so that the collision avoidance operation is performed in the execution mode defined by the assistance level that is set in step S312, S314, S316 or S317.

Figure 13A:
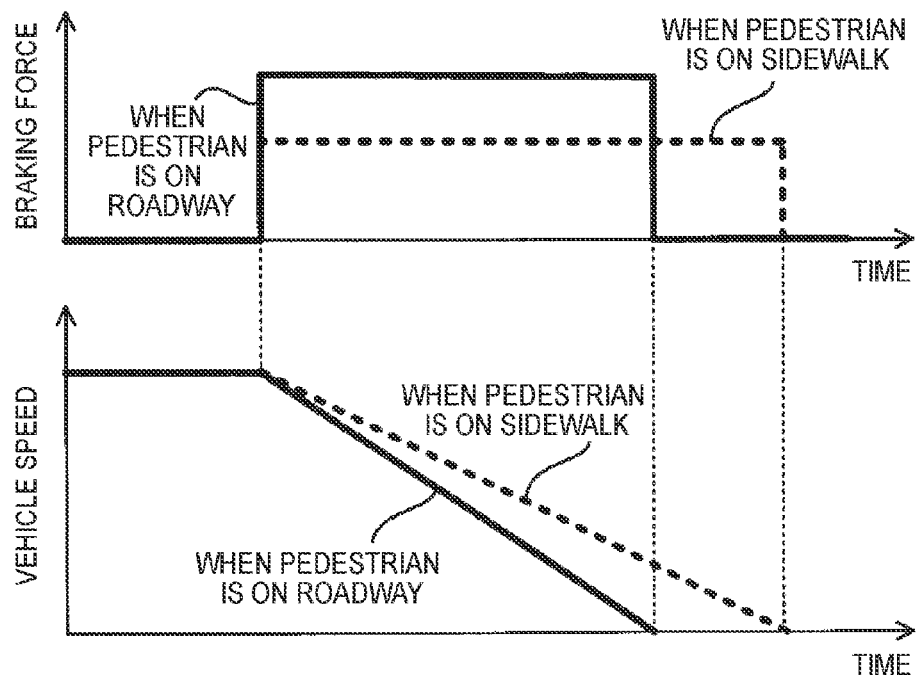
FIG. 13A is a timing diagram showing a temporal change in the braking force that is applied by the travel assistance operation in the third embodiment.

The assistance level may define the maximum deceleration of the vehicle 3 as mentioned above. In this case, in order to perform the collision avoidance operation in the execution mode defined by the assistance level, the travel assistance unit 127 may adjust the magnitude of braking force according to the assistance level. More specifically, the greater the braking force is, the greater the deceleration of the vehicle 3 becomes. Therefore, the travel assistance unit 127 may adjust the magnitude of braking force in such a way that the braking force applied when the assistance level is the level #A is greater than the braking force applied when the assistance level is the level #B, that the braking force applied when the assistance level is the level #B is greater than the braking force applied when the assistance level is the level #C, and that the braking force applied when the assistance level is the level #C is greater than the braking force applied when the assistance level is the level #D. For example, FIG. 13A shows a temporal change in the vehicle speed under the situation where the braking force applied when a pedestrian is positioned on a roadway (that is, the assistance level is the level #A or #B) is greater than the braking force applied when a pedestrian is positioned on a sidewalk (that is, the assistance level is the level #C or #D). FIG. 13A indicates that the vehicle 3 decelerates earlier when the pedestrian is positioned on the roadway than when the pedestrian is positioned on the sidewalk.

The assistance level may define the jerk of the vehicle 3 as described above. In this case, too, in order to perform the collision avoidance operation in the execution mode defined by the assistance level, the travel assistance unit 127 may adjust the magnitude of braking force according to the assistance level. More specifically, the higher the speed at which the braking force becomes greater is (that is, the higher the increase rate is), the greater the jerk of the vehicle 3 becomes. Therefore, the travel assistance unit 127 may adjust the magnitude of braking force in such a way that the increase rate of the braking force applied when the assistance level is the level #A is higher than increase rate of the braking force applied when the assistance level is the level #B, that increase rate of the braking force applied when the assistance level is the level #B is higher than the increase rate of the braking force applied when the assistance level is the level #C, and that the increase rate of the braking force applied when the assistance level is the level #C is higher than the increase rate of the braking force applied when the assistance level is the level #D.

Figure 13B:
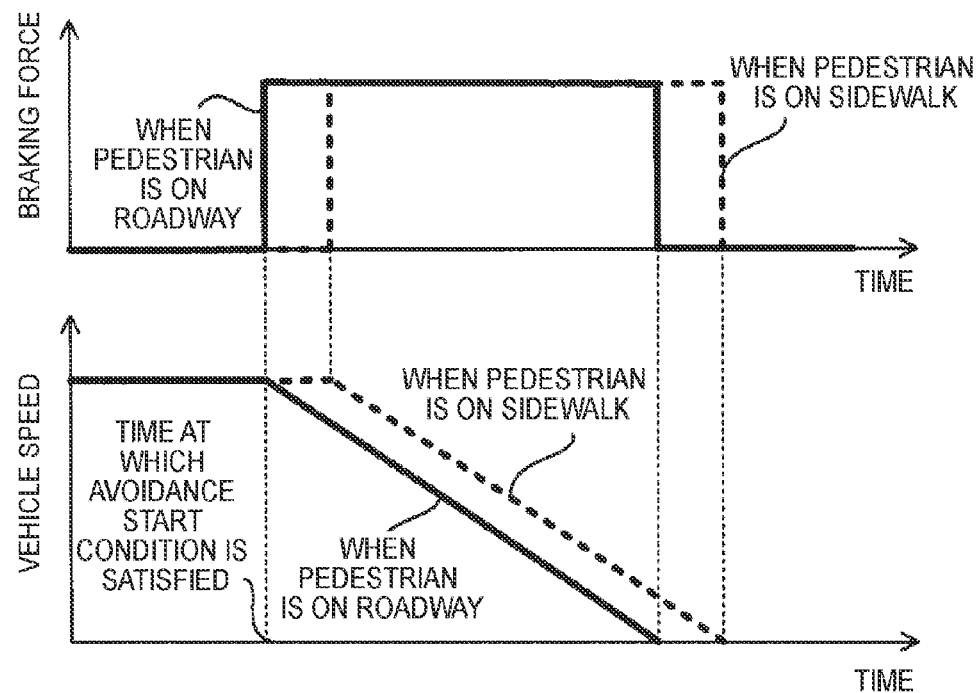
FIG. 13B is a timing diagram showing a temporal change in the braking force that is applied by the travel assistance operation in the third embodiment.

The assistance level may define a time at which the application of braking force is started, as mentioned above. In this case, in order to perform the collision avoidance operation in the execution mode defined by the assistance level, the travel assistance unit 127 may start the application of braking force at the time defined by the assistance level after it is determined that the collision start condition is satisfied. For example, FIG. 13B shows a temporal change in the vehicle speed under the situation where the time at which the application of braking force is started when a pedestrian is positioned on a roadway (that is, the assistance level is level #A or #B) is earlier than the time at which the application of braking force is started when a pedestrian is positioned on a sidewalk (that is, the assistance level is level #C or #D). FIG. 13B indicates that the vehicle 3 decelerates earlier when the pedestrian is positioned on the roadway than when the pedestrian is positioned on the sidewalk.

It should be noted that the time at which the application of braking force is started can be adjusted also by adjusting the predetermined time included in the avoidance start condition. The reason is that, as the predetermined time becomes longer, it becomes easier to predict that a pedestrian will be positioned in the assistance range S within the predetermined time and, as a result, the application of braking force is started at an earlier time. Therefore, in order to perform the collision avoidance operation in the execution mode defined by the assistance level, the operation of the operation determination unit 126 may be performed to adjust the predetermined time in addition to, or instead of, the operation of the travel assistance unit 127 to start the application of braking force at the time defined by the assistance level. More specifically, the operation determination unit 126 may adjust the predetermined time in such a way that the predetermined time used when the assistance level is the level #A is greater than the predetermined time used when the assistance level is the level #B, that the predetermined time used when the assistance level is the level #B is greater than the predetermined time used when the assistance level is the level #C, and that the predetermined time used when the assistance level is the level #C is greater than the predetermined time used when the assistance level is level #D.

On the other hand, if it is predicted that the avoidance start condition is not satisfied as a result of the determination in step S121 (step S121: No), the travel assistance unit 127 controls the brake actuator 13 so that the collision avoidance operation is not performed.

(3-3) Technical Effects of Travel Assistance Operation in the Third Embodiment

As described above, the ECU 32 performs the collision avoidance operation if the avoidance start condition is satisfied. Therefore, the ECU 32 can assist in collision avoidance between the vehicle 3 and a pedestrian.

In particular, in the third embodiment, the assistance level varies according to the type of the segmented area 141 in which a pedestrian is positioned. That is, it can be said that the assistance level is adjusted, considering the relationship between the possibility of collision between the pedestrian and the vehicle 3 and each segmented area 141. Therefore, as in the first embodiment, the travel assistance device in the third embodiment also assists in collision avoidance between the vehicle 3 and the pedestrian considering whether the pedestrian is positioned on a roadway or on a sidewalk.

(4) Modification

In the first embodiment, the width of the assistance range #A may be larger than the width of the assistance range #B, while the length of the assistance range #A may be the same as the length of the assistance range #B. The width of the assistance range #A may be the same as the width of the assistance range #B, while the length of the assistance range #A may be larger than the length of the assistance range #B. The width of the assistance range #A may correspond to a width obtained by expanding the width of the assistance range #B by a first expansion amount on the left side and by expanding the width of the assistance range #B by a second expansion amount, which is different from the first expansion amount, on the right side. The shape of the assistance range #A may be different from the shape of the assistance range #B. It should be noted that, as far as the assistance range #A is larger than the assistance range #B, the relationship between the assistance range #A and the assistance range #B may be any relationship. The same applies to the relationship between the assistance range #B and the assistance range #C and to the relationship between the assistance range #C and the assistance range #D.

In the first embodiment, the travel assistance unit 127 may set the magnitude of braking force applied to the first part, which is included in the assistance range #A or #B and does not overlap with the assistance range #C or #D, equal to the magnitude of braking force applied to the second part which is included in the assistance range #A or #B and overlaps with the assistance range #C or #D.

In the second embodiment, the moving speed setting unit 225 sets the assumed speed in order to make the future movement range of a pedestrian larger as the possibility of collision between the vehicle 2 and the pedestrian is higher. Therefore, in addition to or instead of setting the assumed speed, the moving speed setting unit 225 may set an arbitrary parameter that contributes to the prediction of the future position of a pedestrian (in other words, the movement range) so that the future movement range of the pedestrian becomes larger as the possibility of collision between the vehicle 2 and the pedestrian is higher. As such a parameter, a parameter that can identify the movement mode of the pedestrian (for example, acceleration, moving direction, etc.) may be used in addition to or instead of the moving speed described above.

The plurality of types of segmented areas 141 may include a roadway area 141e, which includes the first roadway area 141a and the second roadway area 141b, instead of the first roadway area 141a and the second roadway area 141b. The plurality of types of segmented areas 141 may include a sidewalk area 141f, which includes the first sidewalk area 141c and the second sidewalk area 141d, instead of the first sidewalk area 141c and the second sidewalk area 141d.

The collision avoidance operation does not have to be an operation of applying braking force to the vehicle 1. The collision avoidance operation may be an arbitrary operation that can contribute even a little to collision avoidance between the vehicle 1 and a pedestrian. For example, the collision avoidance operation may be an operation of warning a passenger that there is a possibility of collision between the vehicle 1 and a pedestrian. However, if the collision avoidance operation is not an operation of applying braking force to the vehicle 1, the travel assistance unit 127 does not adjust the magnitude of braking force in the third embodiment.

Each of the vehicles 1, 2 and 3 may not have at least one of the camera 11 and the millimeter wave radar 112. Each of the vehicles 1, 2 and 3 may have any device (for example, a Lidar), capable of acquiring the pedestrian information, in addition to or instead of at least one of the camera 11 and the millimeter wave radar 112.

At least a part of the configuration requirements of the first to third embodiments and the modification described above may be combined, as appropriate, with at least another part of the configuration requirements of the first to third embodiments and the modification. For example, at least one of the moving speed setting operation in the second embodiment and the assistance level setting operation in the third embodiment may be combined with the first embodiment. For example, the assistance level setting operation in the third embodiment may be combined with the second embodiment. At least a part of the configuration requirements of the first embodiment to the third embodiment and the modified example may not be used.

The above embodiments may be changed as necessary as long as a change is not beyond the gist or thought of the present disclosure, and a travel assistance device including such a change is also included in the technical concept of the present disclosure.

What is claimed is:

1. A travel assistance device comprising:
an actuator; and
at least one electronic control unit configured to
  predict a future position of a vehicle and a future position of an object,
  set an assistance range around the vehicle based on the future position of the vehicle,
  determine whether an avoidance start condition is satisfied, the avoidance start condition being a condition that the object is positioned in the assistance range within a predetermined time,
  determine, when the object is detected, in which of a first roadway area, a second roadway area, and a sidewalk area the object is positioned, the first roadway area being included in a roadway and corresponding to a traveling lane in which the vehicle travels, the second roadway area being included in the roadway and corresponding to a traveling lane in which the vehicle does not travel, the sidewalk area corresponding to a sidewalk,
  set at least one of the avoidance start condition and a movement range of the object, in such a way that the avoidance start condition is more easily determined to be satisfied when the object is determined to be positioned in the first roadway area than when the object is determined to be positioned in the second roadway area, and in such a way that the avoidance start condition is more easily determined to be satisfied when the object is determined to be positioned in the second roadway area than when the object is determined to be positioned in the sidewalk area, the movement range of the object being assumed by the at least one electronic control unit when the future position of the object is predicted, and
  perform a collision avoidance operation to avoid collision between the vehicle and the object, by using the actuator, when the avoidance start condition is determined to be satisfied.

2. The travel assistance device according to claim 1, wherein
the at least one electronic control unit is configured to
  set the avoidance start condition by setting the assistance range,
  set a first range as the assistance range when the object is determined to be positioned in the first roadway area,
  set a second range as the assistance range when the object is determined to be positioned in the second roadway area, the second range being included in, and smaller than, the first range, and
  set a third range as the assistance range when the object is determined to be positioned in the sidewalk area, the third range being included in, and smaller than, the second range.

3. The travel assistance device according to claim 2, wherein
the collision avoidance operation includes a braking operation, the braking operation applying braking force to the vehicle, and
the at least one electronic control unit is configured to
  perform the collision avoidance operation, by using the actuator, in such a way
  that, in a case where the object is determined to be positioned in the first roadway area or the second roadway area and the avoidance start condition is determined to be satisfied, the braking force of a first magnitude is applied, by using the actuator, when the object is predicted to be positioned in a first part within the predetermined time and the object is predicted not to be positioned in a second part within the predetermined time, the first part being included in the first range or the second range and not overlapping with the third range, the second part being included in the first range or the second range and overlapping with the third range, and that, in a case where the object is determined to be positioned in the first roadway area or the second roadway area and the avoidance start condition is determined to be satisfied, the braking force of a second magnitude larger than the first magnitude is applied when the object is predicted to be positioned in the second part within the predetermined time.

4. The travel assistance device according to claim 1, wherein the at least one electronic control unit is configured to set the movement range in such a way that the movement range when the object is determined to be positioned in the first roadway area is larger than the movement range when the object is determined to be positioned in the second roadway area and that the movement range when the object is determined to be positioned in the second roadway area is larger than the movement range when the object is determined to be positioned in the sidewalk area.

5. The travel assistance device according to claim 4, wherein the at least one electronic control unit is configured to set the movement range by setting a moving speed of the object, the moving speed of the object being assumed when the future position of the object is predicted, set a first speed as the moving speed when the object is determined to be positioned in the first roadway area, set a second speed as the moving speed when the object is determined to be positioned in the second roadway area, the second speed being slower than the first speed, and set a third speed as the moving speed when the object is determined to be positioned in the sidewalk area, the third speed being slower than the second speed.

6. The travel assistance device according to claim 1, wherein the sidewalk area includes:

a first sidewalk area corresponding to a sidewalk in which there is not a physical boundary between the sidewalk and the roadway, the physical boundary being capable of inhibiting an entry of the vehicle from the roadway into the sidewalk; and a second sidewalk area corresponding to a sidewalk in which there is the physical boundary between the sidewalk and the roadway, and the at least one electronic control unit is configured to set at least one of the avoidance start condition and the movement range in such a way that the avoidance start condition is more easily determined to be satisfied when the object is determined to be positioned in the first sidewalk area than when the object is determined to be positioned in the second sidewalk area.

7. The travel assistance device according to claim 1, wherein the collision avoidance operation includes a braking operation, the braking operation applying braking force to the vehicle, and the at least one electronic control unit is configured to perform the collision avoidance operation in such a way that the vehicle to which the braking force is applied when the object is determined to be positioned in the first roadway area terminates deceleration earlier than the vehicle to which the braking force is applied when the object is determined to be positioned in the second roadway area and that the vehicle to which the braking force is applied when the object is determined to be positioned in the second roadway area terminates deceleration earlier than the vehicle to which the braking force is applied when the object is determined to be positioned in the sidewalk area.

8. The travel assistance device according to claim 7, wherein the at least one electronic control unit is configured to cause the vehicle terminate deceleration earlier, by adjusting a magnitude of the braking force.

9. The travel assistance device according to claim 7, wherein the at least one electronic control unit is configured to cause the vehicle terminate deceleration earlier, by adjusting a time at which the braking force is applied to the vehicle.

10. The travel assistance device according to claim 2, wherein a length of the first range is larger than a length of the second range in a vehicle width direction, and the length of the second range is larger than a length of the third range in the vehicle width direction.

11. A travel assistance device comprising:

an actuator; and at least one electronic control unit configured to perform a collision avoidance operation to avoid collision between a vehicle and an object by applying braking force to the vehicle, when a predetermined collision avoidance condition is determined to be satisfied, the predetermined collision avoidance condition being defined based on a possibility of collision between the vehicle and the object, determine, when the object is detected, in which of a first roadway area, a second roadway area, and a sidewalk area the object is positioned, the first roadway area being included in a roadway and corresponding to a traveling lane in which the vehicle travels, the second roadway area being included in the roadway and corresponding to a traveling lane in which the vehicle does not travel, the sidewalk area corresponding to a sidewalk, and perform the collision avoidance operation, by using the actuator, in such a way that the vehicle to which the braking force is applied when the object is determined to be positioned in the first roadway area terminates deceleration earlier than the vehicle to which the braking force is applied when the object is determined to be positioned in the second roadway area, and in such a way that the vehicle to which the braking force is applied when the object is determined to be positioned in the second roadway area terminates deceleration earlier than the vehicle to which the braking force is applied when the object is determined to be positioned in the sidewalk area.

12. The travel assistance device according to claim 11, wherein
the at least one electronic control unit is configured to cause the vehicle terminate deceleration earlier, by adjusting a magnitude of the braking force.

13. The travel assistance device according to claim 11, wherein
the at least one electronic control unit is configured to cause the vehicle terminate deceleration earlier, by adjusting a time at which the braking force is applied to the vehicle.

\* \* \* \* \*